US012497579B2

(12) United States Patent
Barros et al.

(10) Patent No.: US 12,497,579 B2
(45) Date of Patent: Dec. 16, 2025

(54) FABRIC CARE UNIT DOSE ARTICLES WITH CAPSULES

(71) Applicant: The Procter & Gamble Company, Cincinnati, OH (US)

(72) Inventors: Andre Martim Barros, Woluwe Saint Etienne (BE); Pierre Daniel Verstraete, Woluwe Saint Lambert (BE); Mariana B. T. Cardoso, Brussels (BE); Hossam Hassan Tantawy, Morpeth (GB); Ernesto Tripodi, Brussels (BE); Dieter Thomas De Hauw, Boortmeerbeek (BE)

(73) Assignee: The Procter & Gamble Company, Cincinnati, OH (US)

( * ) Notice: Subject to any disclaimer, the term of this patent is extended or adjusted under 35 U.S.C. 154(b) by 421 days.

(21) Appl. No.: 17/718,345

(22) Filed: Apr. 12, 2022

(65) Prior Publication Data

US 2023/0323255 A1 Oct. 12, 2023

(51) Int. Cl.

| | |
|---|---|
| ***C11D 3/00*** | (2006.01) |
| ***C11D 3/04*** | (2006.01) |
| ***C11D 3/50*** | (2006.01) |
| ***C11D 17/04*** | (2006.01) |

(52) U.S. Cl.
CPC .............. *C11D 17/044* (2013.01); *C11D 3/04* (2013.01); *C11D 3/505* (2013.01); *C11D 2111/12* (2024.01)

(58) Field of Classification Search
None
See application file for complete search history.

(56) References Cited

U.S. PATENT DOCUMENTS

| | | | |
|---|---|---|---|
| 10,526,570 B2 | 1/2020 | Dreher et al. | |
| 2016/0168509 A1* | 6/2016 | Hitchcock .......... | C11D 17/0039 512/4 |
| 2019/0233970 A1 | 8/2019 | Reed | |
| 2019/0233974 A1 | 8/2019 | Reed | |
| 2020/0297645 A1 | 9/2020 | Sivik et al. | |
| 2020/0330948 A1* | 10/2020 | Cardoso .................. | A61K 8/25 |
| 2020/0330949 A1 | 10/2020 | Cardoso et al. | |
| 2020/0330950 A1 | 10/2020 | Cardoso et al. | |
| 2022/0119740 A1 | 4/2022 | Barros et al. | |
| 2022/0119745 A1 | 4/2022 | Barros et al. | |
| 2022/0258118 A1 | 8/2022 | Cardoso et al. | |

FOREIGN PATENT DOCUMENTS

| | | |
|---|---|---|
| EP | 3919601 A1 | 12/2021 |
| GB | 2498265 A | 7/2013 |
| JP | 2015128762 A | 7/2015 |

(Continued)

OTHER PUBLICATIONS

16252 PCT Search Report and Written Opinion for PCT/US2023/018140 dated Aug. 4, 2023, 13 pages.

*Primary Examiner* — Necholus Ogden, Jr.
(74) *Attorney, Agent, or Firm* — Carolyn S. Powell; George H. Leal

(57) ABSTRACT

Water-soluble unit dose articles that include a water-soluble fibrous non-woven substrate and a particulate treatment composition, the composition including capsules, where the capsules have a shell that includes inorganic material. Related methods of treating a fabric.

19 Claims, 3 Drawing Sheets

(56) References Cited

FOREIGN PATENT DOCUMENTS

| | | | |
|---|---|---|---|
| WO | 9201037 | A1 | 1/1992 |
| WO | 2010013250 | A2 | 2/2010 |
| WO | 2011131644 | A1 | 10/2011 |
| WO | 2019147527 | A1 | 8/2019 |
| WO | 2020123888 | A1 | 6/2020 |
| WO | 2020214878 | A1 | 10/2020 |
| WO | 2022081782 | A1 | 4/2022 |

* cited by examiner

FABRIC CARE UNIT DOSE ARTICLES WITH CAPSULES

FIELD OF THE INVENTION

The present disclosure relates to water-soluble unit dose articles that include a water-soluble fibrous non-woven substrate and a particulate treatment composition, the composition including capsules, where the capsules have a shell that includes inorganic material. The present disclosure also relates to related methods of treating a fabric.

BACKGROUND OF THE INVENTION

Water-soluble unit dose articles are liked by consumers as they are convenient and efficient to use. Such water-soluble unit dose articles often comprise laundry treatment compositions, which may be encapsulated by a water-soluble substrate such as a water-soluble film. When the article is contacted with water, the substrate dissolves and releases the laundry treatment composition into the water, thereby creating an aqueous treatment liquor.

Such laundry treatment compositions may comprise core-shell capsules, in which a benefit agent (such as perfume) in the core is surrounded by a shell. The shells are typically made from petrochemically derived technologies, such as melamine formaldehyde or polyacrylate-based technologies. These days, for environmental sustainability reasons, formulators are exploring how to reduce the amount of petrochemically derived content in their formulations. Additionally, it has been found that when such capsules are formulated into a water-soluble unit dose product, the performance benefits delivered are sub-optimal.

Therefore, there is a need for improved fabric care products in the form of water-soluble unit dose articles that provided improved performance benefits and are characterized by a lower environmental impact via reduced petrochemically derived content.

SUMMARY OF THE INVENTION

The present disclosure relates to water-soluble unit dose articles and related methods of treating a fabric.

For example, the present disclosure relates to a water-soluble unit dose article that includes: a water-soluble fibrous non-woven substrate, the substrate including a plurality of fibers, where the fibers include a water-soluble polymer; and a particulate treatment composition that includes capsules, where the capsules include a core and a shell surrounding the core, where the core includes a benefit agent, and the shell includes an inorganic material.

The present disclosure also relates to a method of treating a fabric, where the method includes the steps of: combining water and a water-soluble unit dose article according to the present disclosure to form a treatment liquor; and contacting a fabric with the treatment liquor, preferably in a drum of an automatic washing machine.

BRIEF DESCRIPTION OF THE DRAWINGS

The figures herein are illustrative in nature and are not intended to be limiting.

DETAILED DESCRIPTION OF THE INVENTION

Figure 1:
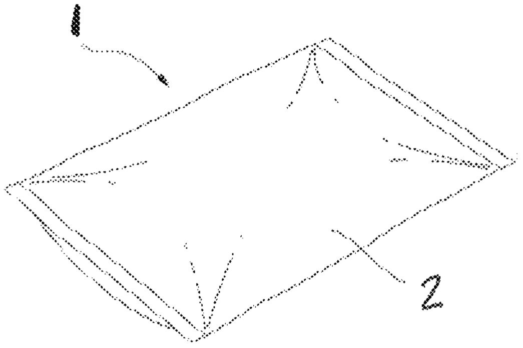
FIG. 1 shows a water-soluble unit dose article according to the present disclosure.

The present disclosure relates to water-soluble unit dose articles that include fabric treatment compositions and related methods. The articles include a water-soluble fibrous non-woven substrate, for example in the form of a sheet or a pouch; the substrate includes a water-soluble polymer. The fabric treatment composition includes core-shell capsules that have a shell comprising inorganic material. It has been found that such unit dose articles can provide surprisingly good performance benefits to target fabrics. For example, when the capsules contain perfume in the core, surprisingly good freshness benefits are observed.

Without wishing to be bound by theory, it is believed there is a synergistic effect between the water-soluble polymer of the substrate and the capsules having inorganic shell materials according to the present disclosure. This synergistic effect results in improved capsule deposition and retention onto fabrics during the wash and an overall improved fabric performance accordingly, when compared to formulating these perfume capsules having shell materials according to the present invention into non-water-soluble-substrate-enclosed fabric treatment compositions.

This is even more surprising considering comparative petrochemically derived encapsulated perfume technologies were found to negatively interact with similar water-soluble polymers, leading to a performance compromise when compared to formulating the comparative in the absence of such water-soluble polymers.

The capsules, compositions, substrates, articles, and related methods are described in more detail below.

As used herein, the articles “a” and “an” when used in a claim, are understood to mean one or more of what is claimed or described. As used herein, the terms “include,” “includes,” and “including” are meant to be non-limiting. The compositions of the present disclosure can comprise, consist essentially of, or consist of, the components of the present disclosure.

The terms “substantially free of” or “substantially free from” may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein, the phrase “treatment composition” includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, dry cleaning agent or composition, laundry rinse additive, wash additive, post-rinse fabric treatment, and the like. Such compositions may be used as a prelaundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Unit Dose Article

The present disclosure relates to water-soluble unit dose articles. The articles are useful for treating fabrics. The water-soluble unit dose articles comprise a water-soluble fibrous non-woven substrate and a particulate treatment composition, where the particulate treatment composition comprises core-shell capsules.

The water-soluble fibrous non-woven substrate, which may be in the form of a sheet, may be shaped to form at least one sealed internal compartment, wherein the treatment composition is contained with the sealed internal compartment.

The unit dose article may comprise a first fibrous non-woven sheet and a second water-soluble fibrous non-woven sheet sealed to one another such to define the internal compartment.

The water-soluble unit dose article is constructed such that the granular detergent composition does not leak out of the compartment during storage. However, upon addition of the water-soluble unit dose article to water, the water-soluble non-woven fibrous sheet dissolves and releases the contents of the internal compartment into the wash liquor.

The compartment should be understood as meaning a closed internal space within the unit dose article, which holds the particulate treatment composition. During manufacture, a first water-soluble fibrous non-woven sheet may be shaped to comprise an open compartment into which the detergent composition is added. A second water-soluble fibrous non-woven sheet may then be laid over the first sheet in such an orientation as to close the opening of the compartment. The first and second sheets are then sealed together along a seal region.

Alternatively, a single water-soluble fibrous non-woven may be shaped into an open container. The granular laundry detergent composition may then be filled into the open container and then the open container sealed to close it.

The unit dose article may comprise more than one compartment, even at least two compartments, or even at least three compartments. The compartments may be positioned in a side-by-side orientation, i.e. one orientated next to the other. Alternatively, one compartment may be completely enclosed within another compartment.

Wherein the unit dose article comprises at least two compartments, one of the compartments may be smaller than the other compartment.

Each compartment may comprise the same or different compositions.

The unit dose article may comprise two or more plies, preferably three or more, of the non-woven substrate. The plies may be connected by any suitable manner, such as by sealing at one or more edges of the article. In such cases, there may be little to no space between the plies; in other words, the article might not include a compartment in such cases. An article may comprise two or more plies stacked atop one another. The article may be formed by folding a sheet of the non-woven substrate upon itself to form two or more plies. Individual articles may be cut out from stacked and/or folded layers of substrate.

FIG. 1 discloses a water-soluble unit dose article (1) according to the present disclosure. The water-soluble unit dose article (1) as shown has a generally rectangular shape; however, it may have any suitable shape including, square, triangular, circular, oval, hexagonal, or a mixture thereof. The water-soluble unit dose article (1) comprises a water-soluble fibrous non-woven substrate (2) in the form of a sheet.

Figure 2:
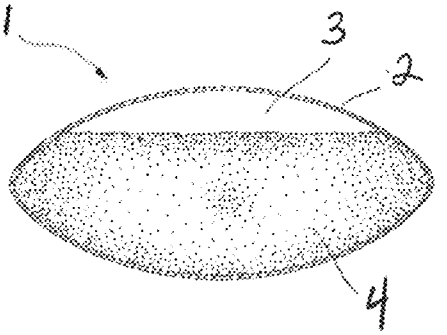
FIG. 2 shows a cross-section of the article of FIG. 1.

As can be seen from FIG. 2, which is a cross-sectional diagram of the water-soluble unit dose article (1) of FIG. 1, the water-soluble fibrous non-woven substrate (2) is shaped to create at least one internal compartment (3) containing the fabric treatment composition (4), which is in particulate form.

Figure 3:
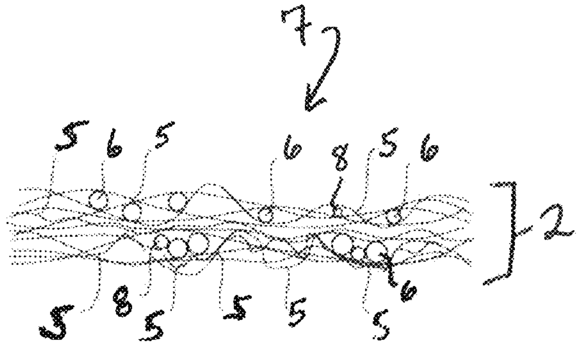
FIG. 3 shows a schematic drawing of an illustrative non-woven substrate in which capsules are comingled with fibers of a water-soluble fibrous non-woven substrate.

FIG. 3 shows a schematic cross-section of an illustrative water-soluble non-woven substrate (2). The non-woven substrate (2) includes fibres (5) that are inter-entangled to form a fibrous structure. Delivery capsules (6) according to the present disclosure may be co-mingled with the fibres (3) to form a co-form structure (7). Additional particles (8) may also be co-mingled with the fibres (3). The additional particles (8) may comprise a treatment adjunct. The additional particles (8) may be particles of an acid and/or a salt thereof, preferably citric acid and/or a salt thereof. The additional particles (8) may be detergent particles that comprise a detergent adjunct ingredient, such as surfactant, as described below.

In the water-soluble unit dose articles of the present disclosure, the treatment composition or a portion thereof may be enclosed within one or more compartments, may be comingled with the plurality of fibers, or may be present as a combination thereof.

The unit dose article of the present disclosure may take the form described in U.S. Pat. No. 10,526,570, which is incorporated by reference.

Water-Soluble Non-Woven Substrate

The water-soluble unit dose article comprises a water-soluble fibrous non-woven substrate. The water-soluble fibrous non-woven sheet comprises a plurality of fibres. Preferably, the fibres are inter-entangled fibres in the form of a fibrous structure. As used herein, "fibres" and "fibers" may be used interchangeably.

The water-soluble fibrous non-woven substrate may be in the form of a sheet or web, which may be cut to suitable sizes, folded upon itself, and/or layered with another substrate, including another non-woven sheet.

The water-soluble fibrous non-woven sheet may be homogeneous or may be layered. If layered, the water-soluble fibrous non-woven sheet may comprise at least two and/or at least three and/or at least four and/or at least five layers.

The water-soluble fibrous non-woven sheet may have a basis weight of between 20 gsm and 60 gsm, preferably between 20 gsm and 55 gsm, more preferably between 25 gsm and 50 gsm, most preferably between 25 gsm and 45 gsm. The basis weight of the water-soluble fibrous non-woven sheet may be between 55 gsm and 5000 gsm, preferably between 250 gsm and 3000 gsm, more preferably between 500 gsm and 2500 gsm, most preferably between 1000 gsm and 2000 gsm. Those skilled in the art will be aware of methods to measure the basis weight. When basis weight is measured on a water-soluble fibrous non-woven sheet comprising particles and/or active containing particles, the basis weight ranges mentioned herein are meant to comprise the basis weight of the combined fibre and particle non-woven sheet. Basis weight of a water-soluble fibrous non-woven sheet may be measured on stacks of twelve usable units using a top loading analytical balance with a resolution of ±0.001 g. The balance is protected from air drafts and other disturbances using a draft shield. A precision cutting die, measuring 8.9 cm'0.009 cm by 8.9 cm±0.009 cm is used to prepare all samples.

With a precision cutting die, cut the samples into squares. Combine the cut squares to form a stack where the stack is twelve samples thick. Measure the mass of the sample stack and record the result to the nearest 0.001 g.

The Basis Weight is calculated in g/m$^2$ (gsm) as follows:

Basis Weight=(Mass of stack)/[(Area of 1 square in stack)×(No. of squares in stack)]

By 'fibre' we herein mean an elongated element having a length exceeding its average diameter, preferably, a length to average diameter ratio of at least about 10.

Preferably, each fibre may have a length of greater than or equal to 5.08 cm, greater than or equal to 7.62 cm, greater than or equal to 10.16, greater than or equal to 15.24 cm or a mixture thereof.

Alternatively, each fibre may have length of less than 5.08 cm, less than 3.81 cm, less than 2.54 cm, or a mixture thereof.

Each fibre may have a width of less than 100 μm, less than 75 μm, less than 50 μm, less than 25 μm, less than 10 μm, less than 5 μm, less than 1 μm or a mixture thereof. Those skilled in the art will be aware of standard methods and techniques to measure the width. Preferred methods include Scanning Electron Microscope (SEM) or an Optical Microscope together with image analysis software.

The water-soluble fibrous non-woven sheet may comprise a plurality of identical or substantially identical, from a compositional perspective, fibres. Alternatively, the water-soluble fibrous non-woven sheet may comprise two or more different fibres according to the present invention. Non-limiting examples of differences in the fibres may be physical differences such as differences in diameter, length, texture, shape, rigidness, elasticity, and the like; chemical differences such as crosslinking level, solubility, melting point, Tg, active agent.

Preferably, the fibres are present between 80% and 95%, preferably between 85% and 93%, more preferably between 87% and 90% by weight of the water-soluble fibrous non-woven sheet.

The water-soluble fibrous non-woven sheet may exhibit different regions, such as different regions of basis weight, density, and/or caliper. The water-soluble fibrous non-woven sheet may comprise texture on one or more of its surfaces. A surface of the water-soluble fibrous non-woven sheet may comprise a pattern, such as a non-random, repeating pattern. An outer surface of the substrate may comprise print, for example indicia such as graphics or text. The unit dose article may comprise an aversive agent such as a bittering agent, preferably at least on an outer surface of the non-woven substrate.

The water-soluble fibrous non-woven sheet may have a thickness between 0.01 mm and 100 mm, preferably between 0.05 mm and 50 mm, more preferably between 0.1 mm and 20 mm, even more preferably between 0.1 mm and 10 mm, even more preferably between 0.1 mm and 5 mm, even more preferably between 0.1 mm and 2 mm, even more preferably between 0.1 mm and 0.5 mm, most preferably between 0.1 mm and 0.3 mm. Those skilled in the art will be aware of standard methods to measure the thickness.

The fibres comprise a water-soluble polymer. Suitable water-soluble polymers may include polyvinyl alcohol, polyvinyl pyrrolidone, starch, carboxymethylcellulose, polyethylene oxide, derivatives thereof, combinations thereof, and other suitable polymers, especially hydroxyl-containing polymers and/or their derivatives, for example starch and/or a starch derivative, such as an ethoxylated starch, acetylated starch, and/or acid-thinned starch, carboxymethylcellulose, hydroxypropyl cellulose, hydroxyethyl cellulose, and their derivatives, or combinations thereof. Preferably, the water-soluble polymer is polyvinyl alcohol. Preferably, the fibres comprise between 50% and 98%, preferably between 65% and 97%, more preferably between 80% and 96%, even more preferably between 88% and 96% by weight of the fibres, of polyvinyl alcohol.

The polyvinyl alcohol polymer may have a weight average molecular weight of from about 5 kDA to about 200 kDa, preferably from about 10 kDa to about 150 kDa, more preferably from about 20 kDa to about 120 kDa. The polyvinyl alcohol polymer may have a weight average molecular weight of from about 50 kDa to about 150 kDa, preferably from about 60 kDa to about 130 kDa, more preferably from about 8 kDa to about 120 kDa, as such molecular weights are believed to be particularly useful when the substrate form a pouch or compartment. The polyvinyl alcohol polymer may have a weight average molecular weight of from about 5 kDa to about 70 kDa, preferably from about 7 kDa to about 65 kDa, more preferably from about 10 kDa to about 60 kDa, even more preferably from about 20 kDa to about 50 kDa, as such molecular weights are believed to be particularly useful when the substrate includes particles comingled with the fibres. "Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121. Those skilled in the art will be aware of other known techniques to determine the weight average molecular weight (MW).

Preferably, the polyvinyl alcohol polymer is a polyvinyl alcohol homopolymer. Preferably, the polyvinyl alcohol homopolymer has an average percentage degree of hydrolysis of from 75% to 100%, preferably of from 80% to 95%, most preferably of from 85% to 90%. Preferably, the polyvinyl alcohol homopolymer has an average viscosity of from 1 to 30 mPas, preferably from 5 to 25 mPas, most preferably from 10 to 20 mPas, wherein the viscosity is measured as a 4% aqueous solution in demineralized water at 20° C.

In addition to a water-soluble polymer, the fibres may also comprise one or more active agents. The nonwoven substrate, sheet, and/or article of the present invention may comprise one or more active agents. Both the fibres and nonwoven substrate/sheet and/or article may comprise one or more active agents. Non-limiting examples of active agents may be selected from the group consisting of: personal cleansing and/or conditioning agents such as hair care agents such as shampoo agents and/or hair colorant agents, hair conditioning agents, skin care agents, sunscreen agents, and skin conditioning agents; laundry care and/or conditioning agents such as fabric care agents, fabric conditioning agents, fabric softening agents, fabric anti-wrinkling agents, fabric care anti-static agents, fabric care stain removal agents, soil release agents, dispersing agents, suds suppressing agents, suds boosting agents, anti-foam agents, and fabric refreshing agents; liquid and/or powder dishwashing agents (for hand dishwashing and/or automatic dishwashing machine applications), hard surface care agents, and/or conditioning agents and/or polishing agents; other cleaning and/or conditioning agents such as antimicrobial agents, antibacterial agents, antifungal agents, fabric hueing agents, perfume, bleaching agents (such as oxygen bleaching agents, hydrogen peroxide, percarbonate bleaching agents, perborate bleaching agents, chlorine bleaching agents), bleach activating agents, chelating agents, builders, lotions, brightening agents, air care agents, carpet care agents, dye transfer-inhibiting agents, clay soil removing agents, anti-redeposition agents, polymeric soil release agents, polymeric dispersing agents, alkoxylated polyamine polymers, alkoxylated polycarboxylate polymers, amphilic graft copolymers, dissolution aids, buffering systems, water-softening agents, water-hardening agents, pH adjusting agents, enzymes, flocculating agents, effervescent agents, preservatives, cosmetic agents, make-up removal agents, lathering agents, deposition aid agents, coacervate-forming agents, clays, thickening agents, latexes, silicas, drying agents, odor control agents, antiperspirant agents, cooling agents, warming agents, absorbent gel agents, anti-inflammatory agents, dyes, pigments, acids, and bases; liquid treatment active agents; agricultural active agents; industrial active agents; ingestible active agents such as medicinal agents, teeth whitening agents, tooth care agents, mouthwash agents, periodontal gum care agents, edible agents, dietary agents, vitamins, minerals; water-treatment agents such as water clarifying and/or water disinfecting agents, and mixtures thereof.

The fibres preferably comprise between 0.1% and 15% by weight of the fibres of a gel-breaker, wherein the gel-breaker is selected from polyols, sugar alcohols, amines, amides, carbohydrates, multivalent cations, or a mixture thereof, preferably polyols, sugar alcohols or a mixture thereof. Preferably, the fibres comprise between 1% and 12%, preferably between 2% and 10% by weight of the fibres of the gel-breaker.

Without wishing to be bound by theory, polyols are synthetic materials, whilst sugar alcohols are natural materials. Sugar alcohols may comprise ribose, xylose, fructose, or a mixture thereof.

Preferably, the gel-breaker is selected from glycerol, polyethylene glycol, 1,2-propanediol, dipropylene glycol, 2-methyl-1,3-propanediol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, and mixtures thereof, preferably selected from polyethylene glycol, glycerol, sorbitol, dipropylene glycol, and mixtures thereof.

Preferably, the fibres comprise between 0.1% and 15%, preferably between 1% and 12%, more preferably between 2% and 10% by weight of the fibres of a gel-breaker selected from the group consisting of glycerol, polyethylene glycol, 1,2-propanediol, dipropylene glycol, 2-methyl-1,3-propanediol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, and mixtures thereof, preferably, the fibres comprise between 0.1% and 15%, preferably between 1% and 12%, more preferably between 2% and 10% by weight of the fibres of a gel-breaker selected from polyethylene glycol, glycerol, sorbitol, dipropylene glycol, and mixtures thereof.

Preferably, the fibres comprise between 0.1% and 15%, preferably between 1% and 12%, more preferably between 2% and 10% by weight of the fibres of the gel-breaker and wherein the fibres comprise between 0.1% and 15%, preferably between 1% and 12%, more preferably between 2% and 10% by weight of the fibres of a gel-breaker selected from glycerol, polyethylene glycol, 1,2-propanediol, dipropylene glycol, 2-methyl-1,3-propanediol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, and mixtures thereof. Preferably, the fibres comprise between 0.1% and 15%, preferably between 1% and 12%, more preferably between 2% and 10% by weight of the fibres of the gel-breaker and wherein the fibres comprise between 0.1% and 15%, preferably between 1% and 12%, more preferably between 2% and 10% by weight of the fibres of a gel-breaker selected from polyethylene glycol, glycerol, sorbitol, dipropylene glycol, and mixtures thereof.

Preferably, the polyethylene glycol has a weight average molecular weight of between 100 and 800, preferably between 200 and 750, more preferably between 400 and 700, even more preferably between 500 and 650. "Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121. Those skilled in the art will be aware of other known techniques to determine the weight average molecular weight (MW).

The fibrous non-woven substrate may comprise particles. The particles may, in part or in whole, be particles of the particulate treatment composition. The particles may comprise the capsules of the present disclosure. Without wishing to be bound by theory, the fibrous non-woven substrate comprises gaps or space between the fibres. When present, the particles in the substrate preferably reside within the gaps/spaces between the fibres. The particles may preferably be present at a level of between 0.25% and 10%, preferably between 0.5% and 5%, more preferably between 1% and 3% by weight of the water-soluble fibrous non-woven substrate. The particles may comprise capsules according to the present disclosure, an acid, zeolite, inorganic salts, surfactant granules or a mixture thereof. Preferably, the inorganic salts comprise sodium carbonate, sodium chloride, sodium sulphate or a mixture thereof. Preferably the particles within the non-woven substrate have an average particle size distribution of between 1 micron and 150 microns, preferably between 5 microns and 125 microns, more preferably between 10 microns and 100 microns. The particles may be water-soluble or water-insoluble. The nonwoven sheet and/or article may comprise water-soluble particles and/or water-insoluble particles. As mentioned herein, the particles may comprise active agent-containing particles. The particles may be present in the nonwoven sheet and/or article at a weight ratio of particles, for example active agent-containing particles, to fibres of 1:100 or greater and/or 1:50 or greater and/or 1:10 or greater and/or 1:3 or greater and/or 1:2 or greater and/or 1:1 or greater and/or from about 10:1 to about 1:100 and/or from about 7:1 to about 1:50 and/or from about 7:1 to about 1:10 and/or from about 7:1 to about 1:3 and/or from about 6:1 to 1:2 and/or from about 5:1 to about 1:1 and/or from about 4:1 to about 1:1 and/or from about 3:1 to about 1.5:1. Non-limiting examples of suitable particles and levels of particles are described in U.S. Pat. No. 8,980,816, which is incorporated by reference.

Preferably, the fibres comprise less than 5%, more preferably less than 3%, even more preferably less than 2% by weight of the fibres of water.

It may be that the fibres do not comprise any surfactant. When surfactant is desired to be part of the article, the surfactant may be comprised in the fabric treatment composition, for example as part of a particulate laundry detergent composition. That being said, the fibres may in certain cases contain surfactant, which may provide additional cleaning benefits.

The fibres may further comprise a plasticizer and/or pH adjusting agents.

The fibres may be made by any suitable process. The fibres may be spun from a filament-forming composition using techniques known to those in the art, where the filament-forming composition comprises the water-soluble polymer. Suitable spinning process operations may include meltblowing, spunbonding, electro-spinning, rotary spinning or mixtures thereof.

Without wishing to be bound by theory, non-woven fibrous sheets exhibit a different dissolution profile to a casted sheet. Dissolution of the fibrous non-woven substrate may be tested according to the method provided in the Test Methods section.

A non-limiting example of a suitable process for making the fibres comprises the steps of:

a. providing a filament-forming composition, such as from a tank; and
b. spinning the filament-forming composition, such as via a spinning die, into one or more fibres; and
c. collecting the fibres onto a collection device, such as a patterned belt.

The filament-forming composition may be transported via suitable piping, with or without a pump, between the tank and the spinning die. The spinning die may comprise a plurality of fibre-forming holes that include a melt capillary encircled by a concentric attenuation fluid hole through which a fluid, such as air, passes to facilitate attenuation of the filament-forming composition into a fibre as it exits the fibre-forming hole.

The filament-forming composition may be spun into one or more fibres by any suitable spinning process, such as meltblowing, spunbonding, electro-spinning, and/or rotary spinning. The filament-forming composition may be spun into a plurality of fibres by meltblowing. For example, the filament-forming composition may be pumped from a tank to a meltblown spinnerette. Upon exiting one or more of the fibre-forming holes in the spinnerette, the filament-forming composition is attenuated with air to create one or more fibres. The fibres may then be dried to remove any remaining solvent used for spinning, such as the water.

The fibres may be collected on a belt, such as a patterned belt to form a fibrous non-woven sheet comprising the fibres.

Preferably, fibrous nonwoven sheets are made by bonding or interlocking fibers by mechanical, thermal, chemical, or solvent means. When fibrous nonwoven sheets are made from staple fibers, their production involves the formation of a uniform web by a wet-laid process or carding, followed by bonding the nonwovens either thermally or by other means such as needle punching, hydroentangling, etc. Spun-laid fibrous nonwovens are made in one continuous process where fibers are spun and then directly dispersed into a web by deflectors or air streams. Melt-blown fibrous nonwoven is a one-step process in which high-velocity air blows a molten thermoplastic resin from an extruder die tip on to a conveyor or take-up screen to form a fine fibrous and self-bonded web.

Additional disclosure related to the fibres, substrates, articles, and processes for making such materials can be found, for example, in U.S. Pat. No. 9,163,205 (equivalent: W02012/003316), and/or U.S. Pat, No. 9,074,305 (equivalent: W02012/003367), and/or U.S. Pat. Application Publication No. 20190233974 A1, and/or US Patent Application Publication No. 20190233970 A1, all of which are incorporated by reference.

Fabric Treatment Composition

The water-soluble unit dose articles according to the present disclosure comprise a fabric treatment composition. The fabric treatment composition is preferably a particulate fabric treatment composition. The fabric treatment compositions of the present disclosure may be a laundry detergent composition, laundry additive composition, or combinations thereof.

The primary function of a laundry detergent composition is typically to remove soils from fabrics. Such detergent compositions typically comprise detersive surfactant, such as anionic surfactant, at levels sufficient to provide soil removal benefits. A laundry detergent composition may comprise detersive surfactant, preferably anionic surfactant, at a level of greater than 5%, preferably greater than 10%, by weight of the treatment composition. When the fabric treatment composition is a detergent composition, it may be preferred to use the unit dose article during a washing operation, for example during a wash cycle in an automatic washing machine.

The primary function of a laundry additive composition is to typically provide alternative or additional benefits, other than soil removal. For example, additive compositions may provide conditioning/softening benefits, freshness and/or malodor-removal benefits, and the like. Laundry additive compositions may be relatively low in detersive surfactant content, for example less than 5%, less than 3%, or even less than 1%, by weight of the treatment composition. When the fabric treatment composition is an additive composition, it may be used in a wash operation and/or a rinse operation, preferably during a rinse operation, for example during a rinse cycle in an automatic washing machine.

Typically, the particles of the composition can be prepared by any suitable method, such as by agglomeration, extrusion, or any combination thereof. Typically, the agglomerates are subjected to particle size classification, for example a fluid bed elutriation and/or a sieve, to obtain the desired particle size distribution. Preferably, the agglomerates have a particle size distribution such that weight average particle size is in the range of from 300 micrometers to 800 micrometers, and less than 10 wt % of the agglomerates have a particle size less than 150 micrometers and less than 10 wt % of the agglomerates have a particle size greater than 1200 micrometers.

The fabric treatment compositions of the present disclosure comprise certain capsules and optional adjunct ingredients, which are described in more detail below.

Capsules

The treatment compositions of the present disclosure comprise capsules. The capsules are typically present as a population of capsules. The capsules comprise a core and a shell surrounding the core. As described in more detail below, the core includes a benefit agent, preferably perfume, and the shell includes an inorganic material.

The capsules may be present in the treatment composition in an amount that is from about 0.05% to about 20%, or from about 0.05% to about 10%, or from about 0.1% to about 5%, or from about 0.2% to about 2%, by weight of the composition. The composition may comprise a sufficient amount of capsules to provide from about 0.05% to about 10%, or from about 0.1% to about 5%, or from about 0.1% to about 2%, by weight of the composition, of benefit agent, preferably perfume, to the treatment composition. When discussing herein the amount or weight percentage of the capsules, it is meant the sum of the shell material and the core material.

The capsules can have a mean shell thickness of 10 nm to 10,000 nm, preferably 170 nm to 1000 nm, more preferably 300 nm to 500 nm.

The capsules can have a mean volume weighted capsule diameter of 0.1 micrometers to 300 micrometers, preferably 5 micrometers to 250 micrometers, more preferably 10 micrometers to 200 micrometers, even more preferably 10 micrometers to 50 micrometers.

It has surprisingly been found that in addition to the inorganic shell, the volumetric core-shell ratio can play an important role to ensure the physical integrity of the capsules. Shells that are too thin vs. the overall size of the capsule (core:shell ratio>98:2) tend to suffer from a lack of self-integrity. On the other hand, shells that are extremely thick vs. the diameter of the capsule (core: shell ratio<80:20) tend to have higher shell permeability in a surfactant-rich matrix. While one might intuitively think that a thick shell leads to lower shell permeability (since this parameter impacts the mean diffusion path of the active across the shell), it has surprisingly been found that the capsules of this invention that have a shell with a thickness above a threshold have higher shell permeability. It is believed that this upper threshold is, in part, dependent on the capsule diameter. Volumetric core-shell ratio is determined according to the method provided in the Test Method section below.

The capsules may have a volumetric core-shell ratio of 50:50 to 99:1, preferably from 60:40 to 99:1, preferably 70:30 to 98:2, more preferably 80:20 to 96:4.

It may be desirable to have particular combinations of these capsule characteristics. For example, the capsules can have a volumetric core-shell ratio of about 99:1 to about 50:50, and have a mean volume weighted capsule diameter of about 0.1 μm to about 200 μm, and a mean shell thickness of about 10 nm to about 10,000 nm. The capsules can have a volumetric core-shell ratio of about 99:1 to about 50:50, and have a mean volume weighted capsule diameter of about 10 μm to about 200 μm, and a mean shell thickness of about 170 nm to about 10,000 nm. The capsules can have a volumetric core-shell ratio of about 98:2 to about 70:30, and have a mean volume weighted capsule diameter of about 10 μm to about 100 μm, and a mean shell thickness of about 300 nm to about 1000 nm.

Methods according to the present disclosure can produce capsule having a low coefficient of variation of capsule diameter. Control over the distribution of size of the capsules can beneficially allow for the population to have improved and more uniform fracture strength. A population of capsules can have a coefficient of variation of capsule diameter of 40% or less, preferably 30% or less, more preferably 20% or less.

The capsules described herein can have an average fracture strength of 0.1 MPa to 10 MPa, preferably 0.25 MPa to 5 MPa, more preferably 0.25 MPa to 3 MPa. Fully inorganic capsules have traditionally had poor fracture strength, whereas for the capsules described herein, the fracture strength of the capsules can be greater than 0.25 MPa, providing for improved stability and a triggered release of the benefit agent upon a designated amount of rupture stress.

It may be preferred that the mean volume weighted diameter of the capsules is between 1 and 200 micrometers, preferably between 1 and 10 micrometers, even more preferably between 2 and 8 micrometers. It may be preferred that the shell thickness is between 1 and 10000 nm, preferably between 1 and 1000 nm, more preferably between 10 and 200 nm. It may be preferred that the capsules have a mean volume weighted diameter between 1 and 10 micrometers and a shell thickness between 1 and 200 nm. It has been found that capsules with a mean volume weighted diameter between 1 and 10 micrometers and a shell thickness between 1 and 200 nm can have a higher Fracture Strength.

In generally, smaller capsules may be relatively stronger and may therefore be preferred. Without intending to be bound by theory, it is believed that the higher fracture strength provides a better survivability during the laundering process, as the process can cause premature rupture of mechanically weak capsules due to the mechanical constraints in the washing machine.

It's believed that capsules having a mean volume weighted diameter between 1 and 10 micrometers and a shell thickness between 10 and 200 nm can offer resistance to mechanical constraints, particularly when made with a certain selection of the silica precursor used. It may be preferred that the precursor has a molecular weight between 2 and 5 kDa, even more preferably a molecular weight between 2.5 and 4 kDa. In addition, the concentration of the precursor can be carefully selected, for example so that the concentration is between 20 and 60 wt %, preferably between 40 and 60 wt %, of the oil phase used during the encapsulation process.

Without intending to be bound by theory, it is believed that higher molecular weight precursors have a slower migration time from the oil phase into the water phase. The slower migration time is believed to arise from the combination of three phenomenon: diffusion, partitioning, and reaction kinetics. This phenomenon can be important in the context of small sized capsules, for example due to the fact that the overall surface area between oil and water in the system increases as the capsule diameter decreases. A higher surface area can lead to higher migration of the precursor from the oil phase to the water phase, which in turn can reduce the yield of polymerization at the interface. Therefore, the higher molecular weight precursors may be useful to mitigate the effects brought by an in increase in surface area, and to obtain capsules according to the present disclosure.

The capsules may be characterized by one or more of the following: (a) a mean volume weighted capsule diameter of from about 1 μm to 250 μm, preferably from about 4 μm to about −225 μm, more preferably 10 μm to about 200 μm; (b) an average shell thickness of about 170 nm to about 1000 nm; (c) a volumetric core/shell ratio of from about 50:50 to about 99:1; (d) the first shell component comprises no more than about 5 wt %, of organic content, by weight of the first shell component; or (e) a mixture thereof.

The cores and shells of the capsules are described in more detail below.

Core

The core of the capsules comprises a benefit agent. The benefit agent is preferably a hydrophobic material. The core may be oil-based, or the core may be aqueous. Preferably, the core is oil-based. The core may be a liquid at the temperature at which it is utilized in a formulated product. The core may be a liquid at and around room temperature.

The core includes perfume. The core may comprise from about 1 wt % to 100 wt % perfume, based on the total weight of the core. Preferably, the core can include 50 wt % to 100 wt % perfume based on the total weight of the core, more preferably 80 wt % to 100 wt % perfume based on the total weight of the core. Typically, higher levels of perfume are preferred for improved delivery efficiency.

The perfume may comprise one or more, preferably two or more, perfume raw materials. The term “perfume raw material” (or “PRM”) as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, “Perfume and Flavor Chemicals”, Vols. I and II; Steffen Arctander Allured Pub. Co. (1994) and “Perfumes: Art, Science and Technology”, Miller, P. M. and Lamparsky, D., Blackie Academic and Professional (1994).

The PRMs may be characterized by their boiling points (B. P.) measured at the normal pressure (760 mm Hg), and their octanol/water partitioning coefficient (P), which may be described in terms of logP, determined according to the test method described in Test methods section. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

Perfume raw materials having a boiling point B. P. lower than about 250° C. and a logP lower than about 3 are known as Quadrant I perfume raw materials. Quadrant 1 perfume raw materials are preferably limited to less than 30% of the perfume composition. Perfume raw materials having a B. P. of greater than about 250° C. and a logP of greater than about 3 are known as Quadrant IV perfume raw materials, perfume raw materials having a B. P. of greater than about 250° C. and a logP lower than about 3 are known as Quadrant II perfume raw materials, perfume raw materials having a B. P. lower than about 250° C. and a logP greater than about 3 are known as a Quadrant III perfume raw materials. Suitable Quadrant I, II, III and IV perfume raw materials are disclosed in U.S. Pat. No. 6,869,923 B1.

The perfume micro-capsule comprises a perfume. Preferably, the perfume of the microcapsule comprises a mixture of at least 3, or even at least 5, or at least 7 perfume raw materials. The perfume of the micro-capsule may comprise at least 10 or at least 15 perfume raw materials. A mixture of perfume raw materials may provide more complex and desirable aesthetics, and/or better perfume performance or longevity, for example at a variety of touchpoints. However, it may be desirable to limit the number of perfume raw materials in the perfume to reduce or limit formulation complexity and/or cost.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The core may comprise, in addition to perfume raw materials, a pro-perfume, which can contribute to improved longevity of freshness benefits. Pro-perfumes may comprise nonvolatile materials that release or convert to a perfume material as a result of, e.g., simple hydrolysis, or may be pH-change-triggered pro-perfumes (e.g. triggered by a pH drop) or may he enzymatically releasable pro-perfumes, or light-triggered. pro-perfumes. The pro-perfumes may exhibit varying release rates depending upon the pro-perfume chosen.

The core of the encapsulates of the present disclosure may comprise a core modifier, such as a partitioning modifier and/or a density modifier. The core may comprise, in addition to the perfume, from greater than 0% to 80%, preferably from greater than 0% to 50%, more preferably from greater than 0% to 30% based on total core weight, of a core modifier. The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described perfume encapsulates.

Shell

The capsules of the present disclosure include a shell that surrounds the core. The shell comprises an inorganic material. The shells of the capsules may comprise from about 90% and about 100%, by weight of the shell, of the inorganic material.

The inorganic material in the shell comprises a material selected from metal oxide, semi-metal oxides, metals, minerals or mixtures thereof. Preferably, the inorganic material is a material selected from $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper or a mixture thereof, more preferably $SiO_2$.

The shell may include a first shell component. The shell may preferably include a second shell component that surrounds the first shell component. The first shell component can include a condensed layer formed from the condensation product of a precursor. As described in detail below, the precursor can include one or more precursor compounds. The first shell component can include a nanoparticle layer. The second shell component can include inorganic materials.

The shell may be substantially inorganic (defined later). The substantially inorganic shell can include a first shell component comprising a condensed layer surrounding the core and may further comprise a nanoparticle layer surrounding the condensed layer. The substantially inorganic shell may further comprise a second shell component surrounding the first shell component. The first shell component comprises inorganic materials, preferably metal/semi-metal oxides, more preferably $SiO_2$, $TiO_2$ and $Al_2O_3$, and even more preferably $SiO_2$. The second shell component comprises inorganic material, preferably comprising materials from the groups of Metal/semi-metal oxides, metals and minerals, more preferably materials chosen from the list of $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper, or mixtures thereof, even more preferably chosen from $SiO_2$, $CaCO_3$, or mixtures thereof Preferably, the second shell component material is of the same type of chemistry as the first shell component in order to maximize chemical compatibility.

The first shell component can include a condensed layer surrounding the core. The condensed layer can be the condensation product of one or more precursors. The one or more precursors may comprise at least one compound from the group consisting of Formula (I), Formula (II), and a mixture thereof, wherein Formula (I) is $(M^vO_zY_n)_w$, and wherein Formula (II) is $(M^vO_zY_nR^1_p)_w$. It may be preferred that the precursor comprises only Formula (I) and is free of compounds according to Formula (II), for example so as to reduce the organic content of the capsule shell (i.e., no $R^1$ groups). Formulas (I) and (II) are described in more detail below.

The one or more precursors can be of Formula (I):

$$(M^vO_zY_n)_w \qquad \text{(Formula I)},$$

where M is one or more of silicon, titanium and aluminum, v is the valence number of M and is 3 or 4, z is from 0.5 to 1.6, preferably 0.5 to 1.5, each Y is independently selected from —OH, $—OR^2$, $—NH_2$, $—NHR^2$, $—N(R^2)_2$, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v−1), and w is from 2 to 2000.

The one or more precursors can be of Formula (I) where M is silicon. It may be that Y is $—OR^2$. It may be that n is 1 to 3. It may be preferable that Y is $—OR^2$ and n is 1 to 3. It may be that n is at least 2, one or more of Y is $—OR^2$, and one or more of Y is —OH.

$R^2$ may be $C_1$ to $C_{20}$ alkyl. $R^2$ may be $C_6$ to $C_{22}$ aryl. $R^2$ may be one or more of $C_1$ alkyl, $C_2$ alkyl, $C_3$ alkyl, $C_4$ alkyl, $C_5$ alkyl, $C_6$ alkyl, $C_7$ alkyl, and $C_5$ alkyl. $R^2$ may be $C_1$ alkyl. $R^2$ may be $C_2$ alkyl. $R^2$ may be $C_3$ alkyl. $R^2$ may be $C_4$ alkyl.

It may be that z is from 0.5 to 1.3, or from 0.5 to 1.1, 0.5 to 0.9, or from 0.7 to 1.5, or from 0.9 to 1.3, or from 0.7 to 1.3.

It may be preferred that M is silicon, v is 4, each Y is $—OR^2$, n is 2 and/or 3, and each $R^2$ is $C_2$ alkyl.

The precursor can include polyalkoxysilane (PAOS). The precursor can include polyalkoxysilane (PAOS) synthesized via a hydrolytic process.

The precursor can alternatively or further include one or more of a compound of Formula (II):

$$(M^vO_zY_nR^1_p)_w \qquad \text{(Formula II)},$$

where M is one or more of silicon, titanium and aluminum, v is the valence number of M and is 3 or 4, z is from 0.5 to 1.6, preferably 0.5 to 1.5, each Y is independently selected from —OH, $—OR^2$, $—NH_2$, $—NHR^2$, $—N(R^2)_2$, wherein $R^2$ is selected from a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S; n is from 0 to (v−1); each $R^1$ is independently selected from the group consisting of: a $C_1$ to $C_{30}$ alkyl; a $C_1$ to $C_{30}$ alkylene; a $C_1$ to $C_{30}$ alkyl substituted with a member (e.g., one or more) selected from the group consisting of a halogen, $—OCF_3$, $—NO_2$, —CN, —NC, —OH, —OCN, —NCO, alkoxy, epoxy, amino, mercapto, acryloyl, —C(O)OH, —C(O)O-alkyl, —C(O)O-aryl, —C(O)O-heteroaryl, and mixtures thereof; and a $C_1$ to $C_{30}$ alkylene substituted with a member selected from the group consisting of a halogen, $—OCF_3$, $—N_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, where pmax=60/[9*Mw($R^1$)+8], where Mw($R^1$) is the molecular weight of the $R^1$ group, and where w is from 2 to 2000.

$R^1$ may be a $C_1$ to $C_{30}$ alkyl substituted with one to four groups independently selected from a halogen, $—OCF_3$, $—NO_2$, —CN, —NC, —OH, —OCN, —NCO, alkoxy, epoxy, amino, mercapto, acryloyl, $CO_2H$ (i.e., C(O)OH), —C(O)O-alkyl, —C(O)O-aryl, and —C(O)O-heteroaryl. $R^1$ may be a $C_1$ to $C_{30}$ alkylene substituted with one to four groups independently selected from a halogen, $—OCF_3$, $—NO_2$, —CN, —NC, —OH, —OCN, —NCO, alkoxy, epoxy, amino, mercapto, acryloyl, $CO_2H$, —C(O)O-alkyl, —C(O)O-aryl, and —C(O)O-heteroaryl.

As indicated above, to reduce or even eliminate organic content in the first shell component, it may be preferred to reduce, or even eliminate, the presence of compounds according to Formula (II), which has R1 groups. The precursor, the condensed layer, the first shell component, and/or the shell may be free of compounds according to Formula (II).

The precursors of formula (I) and/or (II) may be characterized by one or more physical properties, namely a molecular weight (Mw), a degree of branching (DB) and a polydispersity index (PDI) of the molecular weight distribution. It is believed that selecting particular Mw and/or DB can be useful to obtain capsules that hold their mechanical integrity once left drying on a surface and that have low shell permeability in surfactant-based matrices. The precursors of formula (I) and (II) may be characterized as having a DB between 0 and 0.6, preferably between 0.1 and 0.5, more preferably between 0.19 and 0.4, and/or a Mw between 600 Da and 100000 Da, preferably between 700 Da and 60000 Da, more preferably between 1000 Da and 30000 Da. The characteristics provide useful properties of said precursor in order to obtain capsules of the present invention. The precursors of formula (I) and/or (II) can have a PDI between 1 and 50.

The condensed layer comprising metal/semi-metal oxides may be formed from the condensation product of a precursor comprising at least one compound of formula (I) and/or at least one compound of formula (II), optionally in combination with one or more monomeric precursors of metal/semi-metal oxides, wherein said metal/semi-metal oxides comprise TiO2, Al2O3 and SiO2, preferably SiO2. The monomeric precursors of metal/semi-metal oxides may include compounds of the formula $M(Y)_{V-n}R_n$ wherein M, Y and R are defined as in formula (II), and n can be an integer between 0 and 3. The monomeric precursor of metal/semi-metal oxides may be preferably of the form where M is Silicon wherein the compound has the general formula $Si(Y)_{4-n}R_n$ wherein Y and R are defined as for formula (II) and n can be an integer between 0 and 3. Examples of such monomers are TEOS (tetraethoxy orthosilicate), TMOS (tetramethoxy orthosilicate), TBOS (tetrabutoxy orthosilicate), triethoxymethylsilane (TEMS), diethoxy-dimethylsilane (DEDMS), trimethylethoxysilane (TMES), and tetraacetoxysilane (TAcS). These are not meant to be limiting the scope of monomers that can be used and it would be apparent to the person skilled in the art what are the suitable monomers that can be used in combination herein.

The first shell components can include an optional nanoparticle layer. The nanoparticle layer comprises nanoparticles. The nanoparticles of the nanoparticle layer can be one or more of $SiO_2$, $TiO_2$, $Al_2O_3$, $ZrO_2$, $ZnO_2$, $CaCO_3$, clay, silver, gold, and copper. Preferably, the nanoparticle layer can include $SiO_2$ nanoparticles.

The nanoparticles can have an average diameter between 1 nm and 500 nm, preferably between 50 nm and 400 nm.

The pore size of the capsules can be adjusted by varying the shape of the nanoparticles and/or by using a combination of different nanoparticle sizes. For example, non-spherical irregular nanoparticles can be used as they can have improved packing in forming the nanoparticle layer, which is believed to yield denser shell structures. This can be advantageous when limited permeability is required. The nanoparticles used can have more regular shapes, such as spherical. Any contemplated nanoparticle shape can be used herein.

The nanoparticles can be substantially free of hydrophobic modifications. The nanoparticles can be substantially free of organic compound modifications. The nanoparticles can include an organic compound modification. The nanoparticles can be hydrophilic.

The nanoparticles can include a surface modification such as but not limited to linear or branched $C_1$ to $C_{20}$ alkyl groups, surface amino groups, surface methacrylo groups, surface halogens, or surface thiols. These surface modifications are such that the nanoparticle surface can have covalently bound organic molecules on it. When it is disclosed in this document that inorganic nanoparticles are used, this is meant to include any or none of the aforementioned surface modifications without being explicitly called out.

The capsules of the present disclosure may be defined as comprising a substantially inorganic shell comprising a first shell component and a second shell component. By substantially inorganic it is meant that the first shell component can comprise up to 10 wt %, or up to 5 wt % of organic content, preferably up to 1 wt % of organic content, as defined later in the organic content calculation. It may be preferred that the first shell component, the second shell component, or both comprises no more than about 5 wt %, preferably no more than about 2 wt %, more preferably about 0 wt %, of organic content, by weight of the first or shell component, as the case may be.

While the first shell component is useful to build a mechanically robust scaffold or skeleton, it can also provide low shell permeability in liquid products containing surfactants such as laundry detergents, shower-gels, cleansers, etc. (see Surfactants in Consumer Products, J. Falbe, Springer-Verlag). The second shell component can greatly reduce the shell permeability, which improves the capsule impermeability in surfactant-based matrices. A second shell component can also greatly improve capsule mechanical properties, such as a capsule rupture force and fracture strength. Without intending to be bound by theory, it is believed that a second shell component contributes to the densification of the overall shell by depositing a precursor in pores remaining in the first shell component. A second shell component also adds an extra inorganic layer onto the surface of the capsule. These improved shell permeabilities and mechanical properties provided by the $2^{nd}$ shell component only occur when used in combination with the first shell component as defined in this invention.

Additional descriptions of the shell structure, their materials, how these interact with each other to provide optimal performance, and how to make the capsules of the present disclosure can be found in U.S. patent applications Ser. Nos. 16/851173, 16/851176, and 16/851194, whose disclosures in their entirety are incorporated herein by reference.

Method of Making Capsules

Capsules of the present disclosure may be formed by first admixing a hydrophobic material with any of the precursors of the condensed layer as defined above, thus forming the oil phase, wherein the oil phase can include an oil-based and/or oil-soluble precursor. Said precursor/hydrophobic material mixture is then either used as a dispersed phase or as a continuous phase in conjunction with a water phase, where in the former case an O/W (oil-in-water) emulsion is formed and in the latter a W/O (water-in-oil) emulsion is formed once the two phases are mixed and homogenized via methods that are known to the person skilled in the art. Preferably, an O/W emulsion is formed. Nanoparticles can be present in the water phase and/or the oil phase, irrespective of the type of emulsion that is desired. The oil phase can include an oil-based core modifier and/or an oil-based benefit agent and a precursor of the condensed layer. Suitable core materials to be used in the oil phase are described earlier in this document.

Once either emulsion is formed, the following steps may occur:

(a) the nanoparticles migrate to the oil/water interface, thus forming the nanoparticle layer.

(b) The precursor of the condensed layer comprising precursors of metal/semi-metal oxides will start undergoing a hydrolysis/condensation reaction with the water at the oil/water interface, thus forming the condensed layer surrounded by the nanoparticle layer. The precursors of the condensed layer can further react with the nanoparticles of the nanoparticle layer.

The precursor forming the condensed layer can be present in an amount between 1 wt % and 50 wt %, preferably between 10 wt % and 40 wt % based on the total weight of the oil phase.

The oil phase composition can include any compounds as defined in the core section above. The oil phase, prior to emulsification, can include between 10 wt % to about 99 wt % benefit agent.

In the method of making capsules according to the present disclosure, the oil phase may be the dispersed phase, and the continuous aqueous (or water) phase can include water, an acid or base, and nanoparticles. The aqueous (or water) phase may have a pH between 1 and 11, preferably between 1 and 7 at least at the time of admixing both the oil phase and the aqueous phase together. The acid can be a strong acid. The strong acid can include one or more of HCl, $HNO_3$, $H_2SO_4$, HBr, HI, $HClO_4$, and $HClO_3$, preferably HCl. The acid can be a weak acid. The weak acid can be acetic acid or HF. The concentration of the acid in the continuous aqueous phase can be between $10^{-7}$ M and 5 M. The base can be a mineral or organic base, preferably a mineral base. The mineral base can be a hydroxide, such as sodium hydroxide and ammonia. For example, the mineral base can be about $10^{-5}$ M to 0.01 M NaOH, or about $10^{-5}$ M to about 1 M ammonia. The list of acids and bases and their concentration ranges exemplified above is not meant to be limiting the scope of the invention, and other suitable acids and bases that allow for the control of the pH of the continuous phase are contemplated herein.

In the method of making the capsules according to the present disclosure, the pH can be varied throughout the process by the addition of an acid and/or a base. For example, the method can be initiated with an aqueous phase at an acidic or neutral pH and then a base can be added during the process to increase the pH. Alternatively, the method can be initiated with an aqueous phase at a basic or neutral pH and then an acid can be added during the process to decrease the pH. Still further, the method can be initiated with an aqueous phase at an acid or neutral pH and an acid can be added during the process to further reduce the pH. Yet further the method can be initiated with an aqueous phase at a basic or neutral pH and a base can be added during the process to further increase the pH. Any suitable pH shifts can be used. Further any suitable combinations of acids and bases can be used at any time in the method to achieve a desired pH. Any of the nanoparticles described above can be used in the aqueous phase. The nanoparticles can be present in an amount of about 0.01 wt % to about 10 wt % based on the total weight of the aqueous phase.

The method can include admixing the oil phase and the aqueous phase in a ratio of oil phase to aqueous phase of about 1:10 to about 1:1.

The second shell component can be formed by admixing capsules having the first shell component with a solution of second shell component precursor. The solution of second shell component precursor can include a water soluble or oil soluble second shell component precursor. The second shell component precursor can be one or more of a compound of formula (I) as defined above, tetraethoxysilane (TEOS), tetramethoxysilane (TMOS), tetrabutoxysilane (TBOS), triethoxymethylsilane (TEMS), diethoxy-dimethylsilane (DEDMS), trimethylethoxysilane (TMES), and tetraacetoxysilane (TAcS). The second shell component precursor can also include one or more of silane monomers of type $Si(Y)_{4-n}R_n$ wherein Y is a hydrolysable group, R is a non-hydrolysable group, and n can be an integer between 0 and 3. Examples of such monomers are given earlier in this paragraph, and these are not meant to be limiting the scope of monomers that can be used. The second shell component precursor can include salts of silicate, titanate, aluminate, zirconate and/or zincate. The second shell component precursor can include carbonate and calcium salts. The second shell component precursor can include salts of iron, silver, copper, nickel, and/or gold. The second shell component precursor can include zinc, zirconium, silicon, titanium, and/or aluminum alkoxides. The second shell component precursor can include one or more of silicate salt solutions such as sodium silicates, silicon tetralkoxide solutions, iron sulfate salt and iron nitrate salt, titanium alkoxides solutions, aluminum trialkoxide solutions, zinc dialkoxide solutions, zirconium alkoxide solutions, calcium salt solution, carbonate salt solution. A second shell component comprising $CaCO_3$ can be obtained from a combined use of calcium salts and carbonate salts. A second shell component comprising $CaCO_3$ can be obtained from Calcium salts without addition of carbonate salts, via in-situ generation of carbonate ions from $CO_2$.

The second shell component precursor can include any suitable combination of any of the foregoing listed compounds.

The solution of second shell component precursor can be added dropwise to the capsules comprising a first shell component. The solution of second shell component precursor and the capsules can be mixed together between 1 minute and 24 hours. The solution of second shell component precursor and the capsules can be mixed together at room temperature or at elevated temperatures, such as 20° C. to 100° C.

The second shell component precursor solution can include the second shell component precursor in an amount between 1 wt % and 50 wt % based on the total weight of the solution of second shell component precursor Capsules with a first shell component can be admixed with the solution of the second shell component precursor at a pH of between 1 and 11. The solution of the second shell precursor can contain an acid and/or a base. The acid can be a strong acid. The strong acid can include one or more of HCl, $HNO_3$, $H_2SO_4$, HBr, HI, $HClO_4$, and $HClO_3$, preferably HCl. In other embodiments, the acid can be a weak acid. In embodiments, said weak acid can be acetic acid or HF. The concentration of the acid in the second shell component precursor solution can be between $10^{-7}$ M and 5 M. The base can be a mineral or organic base, preferably a mineral base. The mineral base can be a hydroxide, such as sodium hydroxide and ammonia. For example, the mineral base can be about $10^{-5}$ M to 0.01 M NaOH, or about $10^{-5}$ M to about 1 M ammonia. The list of acids and bases exemplified above is not meant to be limiting the scope of the invention, and other suitable acids and bases that allow for the control of the pH of the second shell component precursor solution are contemplated herein.

The process of forming a second shell component can include a change in pH during the process. For example, the process of forming a second shell component can be initiated at an acidic or neutral pH and then a base can be added during the process to increase the pH. Alternatively, the process of forming a second shell component can be initiated at a basic or neutral pH and then an acid can be added during the process to decrease the pH. Still further, the process of forming a second shell component can be initiated at an acid or neutral pH and an acid can be added during the process to further reduce the pH. Yet further the process of forming a second shell component can be initiated at a basic or neutral pH and a base can be added during the process to further increase the pH. Any suitable pH shifts can be used. Further any suitable combinations of acids and bases can be used at any time in the solution of second shell component precursor to achieve a desired pH. The process of forming a second shell component can include maintaining a stable pH during the process with a maximum deviation of +/−0.5 pH unit. For example, the process of forming a second shell component can be maintained at a basic, acidic or neutral pH. Alternatively, the process of forming a second shell component can be maintained at a specific pH range by controlling the pH using an acid or a base. Any suitable pH range can be used. Further any suitable combinations of acids and bases can be used at any time in the solution of second shell component precursor to keep a stable pH at a desirable range.

Whether making an oil-based core or aqueous core, the emulsion can be cured under conditions to solidify the precursor thereby forming the shell surrounding the core.

The reaction temperature for curing can be increased in order to increase the rate at which solidified capsules are obtained. The curing process can induce condensation of the precursor.

The curing process can be done at room temperature or above room temperature. The curing process can be done at temperatures 30° C. to 150° C., preferably 50° C. to 120° C., more preferably 80° C. to 100° C. The curing process can be done over any suitable period to enable the capsule shell to be strengthened via condensation of the precursor material. The curing process can be done over a period from 1 minute to 45 days, preferably 1 hour to 7 days, more preferably 1 hour to 24 hours. Capsules are considered cured when they no longer collapse. Determination of capsule collapse is detailed below. During the curing step, it is believed that hydrolysis of Y moieties (from formula (I) and/or (II)) occurs, followed by the subsequent condensation of a —OH group with either another —OH group or another moiety of type Y (where the 2 Y moieties are not necessarily the same). The hydrolysed precursor moieties will initially condense with the surface moieties of the nanoparticles (provided they contain such moieties). As the shell formation progresses, the precursor moieties will react with said preformed shell.

The emulsion can be cured such that the shell precursor undergoes condensation. The emulsion can be cured such that the shell precursor reacts with the nanoparticles to undergo condensation. Shown below are examples of the hydrolysis and condensation steps described herein for silica-based shells:

Hydrolysis: $\equiv Si—OR+H_2O \rightarrow \equiv Si—OH+ROH$

Condensation: $\equiv Si—OH+\equiv Si—OR \rightarrow \equiv Si—O—Si\equiv +ROH$ $\equiv Si—OH+\equiv Si—OH \rightarrow \equiv Si—O—Si\equiv +H_2O$.

For example, when a precursor of formula (I) or (II) is used, the following describes the hydrolysis and condensation steps:

Hydrolysis: $\equiv M\text{-}Y+H_2O \rightarrow \equiv M\text{-}OH+YH$

Condensation: $\equiv M\text{-}OH+\equiv M\text{-}Y \rightarrow \equiv M\text{-}O\text{-}M\equiv +YH$ $\equiv M\text{-}OH+\equiv M\text{-}OH \rightarrow \equiv M\text{-}O\text{-}M\equiv +H_2O$.

The capsules may be provided as a slurry composition (or simply "slurry" herein). The result of the methods described herein may be a slurry containing the capsules. The slurry can be formulated into a product, such as a consumer product.

The capsules may be freeze dried. Such a preparation method may be preferred when the capsules are intended to be incorporated into a dry treatment composition, such as the particulate treatment compositions of the present disclosure.

Figure 4:
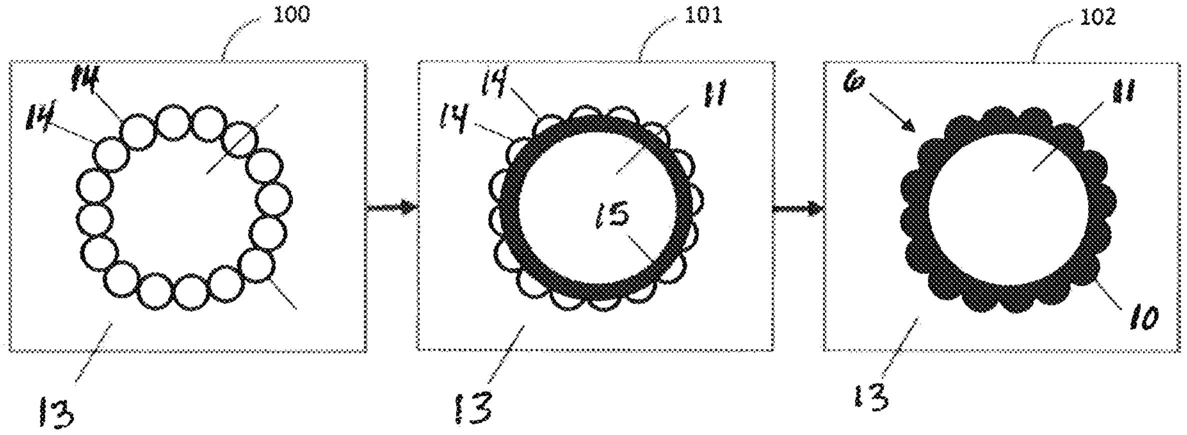
FIG. 4 shows a schematic illustration of the method of making capsules with a first shell component, prepared with a hydrophobic core.

FIG. 4 shows a schematic illustration of the method of making capsules (6). The capsules (6) may have a first shell component (10), prepared with a hydrophobic core (11). For example, in the first box (100), an oil phase (12) is provided to an aqueous phase (13). The oil phase (12) comprises a hydrophobic benefit agent, such as one or more perfume raw materials, as well as a liquid precursor material. Nanoparticles (14) have surrounded the oil phase (12), for example forming a Pickering emulsion. In the second box (101), a hydrolyzed precursor (15) begins to form at the interface around a core (11), where the core (11) comprises an oil phase that includes the benefit agent. In the third box (102), a first shell component (10) has formed around the core (11), where the first shell component is formed from the nanoparticles (14) and the hydrolyzed precursor (15).

Figure 5:
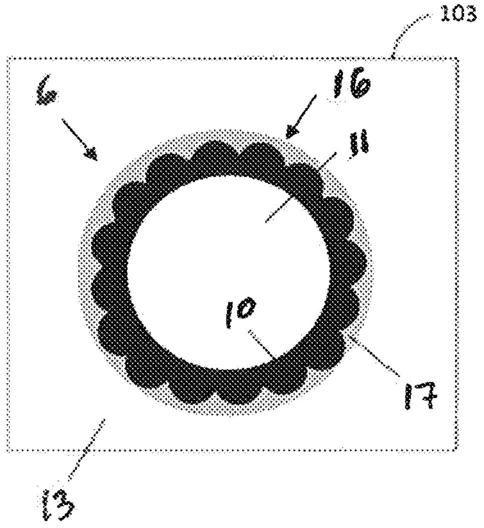
FIG. 5 shows a schematic illustration of a capsule with a first shell component and a second shell component.

FIG. 5 shows a schematic illustration in box (103) of a capsule (6) with a shell (16), the shell (16) having a first shell component (10) and a second shell component (17), around a core (11). The capsule (6) is shown in an aqueous phase (13). The core (11) comprises one or more perfume raw materials.

Adjunct Materials

In addition to the capsules described above, the treatment composition may include adjunct materials. Such materials should be suitable for inclusion in a particulate fabric treatment composition. The selection of adjunct materials may depend on whether the treatment composition is a laundry detergent composition or a laundry additive composition.

Adjunct materials that are suitable for a laundry detergent composition can include: detersive surfactant, such as anionic detersive surfactants, non-ionic detersive surfactants, cationic detersive surfactants, zwitterionic detersive surfactants and amphoteric detersive surfactants; polymers, such as carboxylate polymers, soil release polymer, anti-redeposition polymers, cellulosic polymers and care polymers; bleach, such as sources of hydrogen peroxide, bleach activators, bleach catalysts and pre-formed peracids; photo-bleach, such as such as zinc and/or aluminium sulphonated phthalocyanine; enzymes, such as proteases, amylases, cellulases, lipases; zeolite builder; phosphate builder; co-builders, such as citric acid and citrate; carbonate, such as sodium carbonate and sodium bicarbonate; sulphate salt, such as sodium sulphate; silicate salt such as sodium silicate; chloride salt, such as sodium chloride; brighteners; chelants; hueing agents; dye transfer inhibitors; dye fixative agents; perfume; silicone; fabric softening agents, such as clay; flocculants, such as polyethyleneoxide; suds supressors; and any combination thereof.

Suitable particulate laundry detergent compositions may have a low buffering capacity. Such laundry detergent compositions typically have a reserve alkalinity to pH 9.5 of less than 5.0 gNaOH/100 g. These low buffered laundry detergent compositions typically comprise low levels of carbonate salt.

The particulate laundry detergent composition may comprise from 1 wt % to 50 wt % of a surfactant system. Suitable detersive surfactants include anionic detersive surfactants, non-ionic detersive surfactant, cationic detersive surfactants, zwitterionic detersive surfactants and amphoteric detersive surfactants. Suitable detersive surfactants may be linear or branched, substituted or un-substituted, and may be derived from petrochemical material or biomaterial.

The treatment composition may comprise an acid and/or a salt thereof. Preferably, the acid is an organic acid and/or a salt thereof. Such acids (and their salts) may be particularly useful at high levels in a laundry additive composition as they can provide malodor reduction and/or conditioning benefits, such as softening.

The acid and/or its salt may be present at a level of from about 10 wt % to about 99 wt %, preferably from about 25 wt % to about 99 wt %, more preferably from about 50 wt % to about 99 wt %, even more preferably from about 75 wt % to about 99 wt %, by weight of the particulate treatment composition.

A preferred acid is selected from carboxylic acids. A highly preferred acid is citric acid. A preferred acid is a $C_1$-$C_{12}$ carboxylic acid. The term $C_1$ -$C_{12}$ carboxylic acids refers to carboxylic acids that have from 1 to 12 carbon atoms, including the C-atom of the carboxyl group. The carboxylic acids may be saturated hydrocarbons. Alternatively, the carboxylic acids may be unsaturated hydrocarbons.

The carboxylic acid may be a cyclic carboxylic acid. Examples of cyclic carboxylic acids are lactones, for example ascorbic acid. The carboxylic acid may be an aromatic carboxylic acid. An example of an aromatic carboxylic acid is salicylic acid.

Preferably, the carboxylic acid is at least a di carboxylic acid. More preferably, it is at least a tri carboxylic acid. At least a tri-carboxylic acid means that it carries at least three carboxylic groups.

Preferably, the carboxylic acid is a $C_4$ -$C_8$ carboxylic acid. In a preferred embodiment of the present invention, the carboxylic acid is selected from $C_2$ -$C_6$ carboxylic acids.

Preferably, the acid is selected from the group consisting of acetic acid, propionic acid, butyric acid, isobutyric acid, valeric acid, caproic acid, citric acid, succinic acid, hydroxysuccinic acid, maleic acid, fumaric acid, oxylic acid, glyoxylic acid, adipic acid, lactic acid, lactic acid, tartric acid, salicylic acid, ascorbic acid, a salt thereof, and mixtures thereof Where salts are present, the potassium, calcium and/or sodium salts are preferred.

The acid, and especially the carboxylic acid, such as citric acid, may be in the form of a salt. Preferably, the salts of the acid are potassium, sodium, calcium, and/or sodium salts, more preferably the potassium or sodium salt, even more sodium salt. More preferably, the acid is the tri-potassium and/or tri-sodium salt of a tri-carboxylic acid. Most preferably, the acid is the tri-potassium and/or tri-sodium salt of citric acid.

The acid may preferably be selected from citric acid, a salt thereof, and a mixture thereof. More preferably, the acid is a mixture of citric acid and a salt thereof, even more preferably a mixture of citric acid and sodium citrate. It has been found that such materials can provide malodor control and/or conditioning benefits to fabrics.

It may be useful to select certain weight ratios of the acid form to its salt form, for example to help control pH. For example, the acid form and the salt form, preferably citric acid and sodium citrate, may be present in a weight ratio of from about 1:1 to 1:0, preferably from about 1:1 to about 20:1, preferably from about 2:1 to about 15:1, preferably from about 5:1 to about 10:1, more preferably from about 6:1 to about 8:1.

The above acids and their salts are commercially available and their synthesis, or isolation from raw materials, is known to the skilled person.

The acid, preferably citric acid and/or its salt, is preferably in particulate form. The citric acid may comprise a coating. The coating may preferably be starch.

Methods of Treatment

The present disclosure relates to a method of treating a fabric. Suitable fabrics may include garments, towels, or linens.

The method may comprise the steps of: combining water and a water-soluble unit dose article according to the present disclosure to form a treatment liquor; and contacting a fabric with the treatment liquor, preferably in the drum of an automatic washing machine.

In general, the treatment liquor is formed by the dissolution of the unit dose article in the water. The resulting treatment liquor will include the treatment composition (which will preferably be substantially dissolved or dispersed) and the water-soluble polymers of the water-soluble fibrous substrate, which is also intended to be dissolved.

The treatment liquor may be formed by diluting the water-soluble unit dose article between 200- and 3000-fold, preferably between 300- and 2000-fold, with water.

The water used to make the treatment liquor may water of any hardness, preferably between 0 gpg to 40 gpg. The treatment liquor may be at a temperature of between 5° C. and 90° C., preferably between 10° C. and 60° C., more preferably between 12° C. and 45° C., most preferably between 15° C. and 40° C.

The treatment liquor, preferably a rinse liquor, may be characterized by an acidic pH, preferably by a pH of below about 6, more preferably a pH of from about 2 to about 6, even more preferably from about 3 to about 5.5, even more preferably of from about 4 to about 5. Such pH profiles may be useful in treating certain fabrics, particularly when malodor reduction benefits are desired. For example, the treatment composition may comprise an acid, and the pH of the treatment liquor may be relatively lower than the pH of the water used to make the treatment liquor as a result of the release of the acid from the unit dose article. The aqueous treatment liquor may have a pH that is at least one pH unit lower than the pH of the water. The incoming water may be substantially neutral or even basic, while the resulting treatment liquor is acidic.

The treatment liquor may comprise between 0.01 and 100 ppm, preferably between 0.1 and 10 ppm of the water-soluble polymer of the fibrous substrate, preferably polyvinyl alcohol. The treatment liquor may comprise between 1 and 1000 ppm, preferably between 10 and 100 ppm, of the capsules. The capsules and the water-soluble polymer, preferably polyvinyl alcohol, may preferably be present in the treatment liquor in a weight ratio of from 1:1 to 100:1, preferably from 10:1 to 50:1. Such ratios are believed to be helpful in optimizing the performance benefits, for example by facilitating deposition of the capsules onto target fabrics.

The method may also comprise the step of contacting a fabric with the treatment liquor, preferably in the drum of an automatic washing machine.

The contacting step may occur in the wash cycle of an automatic washing machine, which may be preferred when the treatment composition is a laundry detergent composition. In such cases, the unit dose article may be added directly to the drum of the automatic washing machine, or to a dispenser compartment.

The contacting step may occur in a rinse cycle of an automatic washing machine, which may be preferred when the treatment composition is a laundry additive composition. In such cases, the unit dose article may preferably be added to a dispenser compartment of the automatic washing machine for convenient dispensing at the proper time.

Preferably, treatment of the fabrics in the treatment liquor takes between 5 minutes and 50 minutes, preferably between 5 minutes and 40 minutes, more preferably between 5 minutes and 30 minutes, even more preferably between 5 minutes and 20 minutes, most preferably between 6 minutes and 18 minutes to complete.

COMBINATIONS

Specifically contemplated combinations of the disclosure are herein described in the following lettered paragraphs.

These combinations are intended to be illustrative in nature and are not intended to be limiting.

A. A water-soluble unit dose article comprising: a water-soluble fibrous non-woven substrate, the substrate comprising a plurality of fibers, the fibers comprising a water-soluble polymer; and a particulate treatment composition, the particulate treatment composition comprising capsules, the capsules comprising a core and a shell surrounding the core, the core comprising a benefit agent, the shell comprising an inorganic material.

B. The water-soluble unit dose article according to paragraph A, wherein the water-soluble fibrous non-woven substrate has a basis weight of between 20 gsm and 60 gsm, preferably between 20 gsm and 55 gsm, more preferably between 25 gsm and 50 gsm, most preferably between 25 gsm and 45 gsm.

C. The water-soluble unit dose article according to any of paragraphs A or B, wherein the water-soluble fibrous non-woven substrate is in the form of a sheet that is shaped to form at least one sealed internal compartment, wherein the treatment composition is contained with the sealed internal compartment.

D. The water-soluble unit dose article according to any of paragraphs A-C, wherein the capsules, preferably the treatment composition, is commingled with the plurality of fibers of the water-soluble fibrous non-woven substrate to form a coform structure.

E. The water-soluble unit dose article according to any of paragraphs A-D, wherein the water-soluble polymer comprises polyvinyl alcohol, polyvinyl pyrrolidone, starch, carboxymethylcellulose, polyethylene oxide, derivatives thereof, or combinations thereof, preferably wherein the water-soluble polymer comprises polyvinyl alcohol, more preferably wherein the polyvinyl alcohol polymer has a weight average molecular weight of between 5 kDa and 70 kDa, preferably between 7 kDa and 65 kDa, more preferably between 10 kDa and 60 kDa.

F. The water-soluble unit dose article according to any of paragraphs A-E, wherein the fibers further comprise a gel-breaker, preferably wherein the gel-breaker is selected from polyols, sugar alcohols, amines, amides, carbohydrates, multivalent cations, or a mixture thereof, more preferably polyols, sugar alcohols, or a mixture thereof, even more preferably polyethylene glycol, glycerol, sorbitol, dipropylene glycol, and mixtures thereof, even more preferably polyethylene glycol, preferably a polyethylene glycol characterized by a weight average molecular weight of between 100 and 800, preferably between 200 and 750, more preferably between 400 and 700, even more preferably between 500 and 650.

G. The water-soluble unit dose article according to any of paragraphs A-F, wherein the benefit agent comprises perfume.

H. The water-soluble unit dose article according to any of paragraphs A-G, wherein the shells of the capsules comprise from about 90% and about 100%, by weight of the shell of the inorganic material.

I. The water-soluble unit dose article according to any of paragraphs A-H, wherein the inorganic material in the shell comprises a material selected from metal oxide, semi-metal oxides, metals, minerals or mixtures thereof, preferably a material selected from $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper, or a mixture thereof.

J. The water-soluble unit dose article according to any of paragraphs A-I, wherein the shell comprises: (a) a first shell component comprising a condensed layer and a nanoparticle layer, where the condensed layer comprises a condensation product of a precursor, and where the nanoparticle layer comprises inorganic nanoparticles, and where the condensed layer is disposed between the core and the nanoparticle layer; and (b) a second shell component surrounding the first shell component, where the second shell component surrounds the nanoparticle layer.

K. The water-soluble unit dose article according to any of paragraphs A-J, wherein the capsules are characterized by one or more of the following: a mean volume weighted capsule diameter of from about 1 μm to 250 μm, preferably from about 4 μm to about 225 μm, more preferably 10 μm to about 200; an average shell thickness of about 170 nm to about 1000 nm; a volumetric core/shell ratio of from about 50:50 to about 99:1; the first shell component comprises no more than about 5 wt %, of organic content, by weight of the first shell component; or a mixture thereof.

L. The water-soluble unit dose article according to any of paragraphs J or K, wherein the precursor comprises at least one compound selected from the group consisting of Formula (I), Formula (II), or a mixture thereof, wherein Formula (I) is $(M^vO_zY_n)_w$, wherein Formula (II) is $(M^vO_zY_nR^1{}_p)_w$, wherein for Formula (I), Formula (II), or the mixture thereof:

each M is independently selected from the group consisting of silicon, titanium, and aluminum, v is the valence number of M and is about 3 or about 4, z is from about 0.5 to about 1.6, each Y is independently selected from —OH, —$OR^2$, halogen,

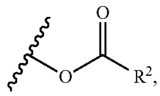

—$NH_2$, $NHR^2$, —$N(R^2)_2$, and

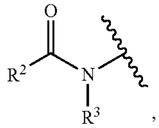

, wherein $R^2$ is a $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S;

wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S;

w is from about 2 to about 2000;

wherein for Formula (I), n is from 0.7 to (v−1); and wherein for Formula (II), n is from 0 to (v−1);

each $R^1$ is independently selected from the group consisting of: a $C_1$ to $C_{30}$ alkyl; a $C_1$ to $C_{30}$ alkylene; a $C_1$ to $C_{30}$ alkyl substituted with a member selected from the group consisting of a halogen, —$OCF_3$, —$NO_2$, —CN, —NC, —OH, —OCN, —NCO, alkoxy, epoxy, amino, mercapto, acryloyl, —$CO_2H$, —C(O)-alkyl, —C(O)O-aryl, and —C(O)O-heteroaryl; and a $C_1$ to $C_{30}$ alkylene substituted with a member selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, wherein pmax=60/[9*Mw($R^1$)+8], wherein Mw($R^1$) is the molecular weight of the $R^1$ group.

M. The water-soluble unit dose article according to paragraph L, wherein for the compounds of Formula (I), Formula (II), or both, M is silicon.

N. The water-soluble unit dose article according to any of paragraphs L or M, wherein one of the compounds of Formula (I), Formula (II), or both are characterized by one or more of the following: a Polystyrene equivalent Weight Average Molecular Weight (Mw) of from about 700 Da to about 30,000 Da; a degree of branching of about 0.2 to about 0.6; a molecular weight polydispersity index of about 1 to about 20; or a mixture thereof.

O. The water-soluble unit dose article according to any of paragraphs L-N, wherein for Formula (I), Formula (II), or both, Y is OR, wherein R is selected from a methyl group, an ethyl group, a propyl group, or a butyl group, preferably an ethyl group.

P. The water-soluble unit dose article according to any of paragraphs J-O, wherein the inorganic nanoparticles of the first shell component comprise at least one of metal nanoparticles, mineral nanoparticles, metal-oxide nanoparticles or semi-metal oxide nanoparticles or a mixture thereof, preferably wherein the inorganic nanoparticles comprise one or more materials selected from the group consisting of $SiO_2$, $TiO_2$, $Al_2O_3$, $Fe_2O_3$, $Fe_3O_4$, $CaCO_3$, clay, silver, gold, copper or a mixture thereof.

Q. The water-soluble unit dose article according to any of paragraphs J-P, wherein the second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, clay, or a mixture thereof.

R. The water-soluble unit dose article according to any of paragraphs A-Q, wherein the particulate treatment composition further comprises from about 10% to about 99%, by weight of the particulate treatment composition of an acid and/or a salt thereof, preferably an acid selected from the group consisting of acetic acid, propionic acid, butyric acid, isobutyric acid, valeric acid, caproic acid, citric acid, succinic acid, hydroxysuccinic acid, maleic acid, fumaric acid, oxylic acid, glyoxylic acid, adipic acid, lactic acid, lactic acid, tartric acid, salicylic acid, ascorbic acid, a salt thereof, and mixtures thereof.

more preferably wherein the active agent acid is selected from the group consisting of citric acid, a salt thereof, and a mixture thereof, even more preferably wherein the active agent acid is a mixture of citric acid and sodium citrate, preferably wherein the weight ratio of citric acid to sodium citrate is from about 1:1 to about 1:0, preferably from about 1:1 to about 20:1, preferably from about 2:1 to about 15:1, preferably from about 5:1 to about 10:1, more preferably from about 6:1 to about 8:1.

S. The water-soluble unit dose article according to any of paragraphs A-R, wherein the article further comprises surfactant, wherein the surfactant is comprised in the fibers, the particulate treatment composition, or a combination thereof, preferably wherein the surfactant is selected from the group consisting of anionic surfactants, nonionic surfactants, cationic surfactants, zwitterionic surfactants, amphoteric surfactants, ampholytic surfactants, and mixtures thereof.

T. A method of treating a fabric, the method comprising the steps of: combining water and the water-soluble unit dose article according to any of paragraphs A-S to form a treatment liquor; and contacting a fabric with the treatment liquor, preferably in a drum of an automatic washing machine.

TEST METHODS

It is understood that the test methods that are disclosed in the Test Methods Section of the present application should be used to determine the respective values of the parameters of Applicant's claimed subject matter as claimed and described herein.

Substrate Dissolution

Below is a test method for measuring dissolution of the fibrous non-woven substrate. The following equipment can be used in the exemplary dissolution method:

2000 mL glass beaker (approximately 7.5 inch tall by 5.5 inch in diameter)

Magnetic Stirrer Plate (Labline, Melrose Park, IL, Model No. 1250 or equivalent)

Magnetic Stirring Rod (2 inch long by ⅜ inch in diameter, Teflon coated)

Thermometer (1 to 100° C. +/−1° C.)

1.25 inch paper binder clip

Alligator clamp (about one inch long)

Depth adjuster rod and holder with base

Timer (accurate to at least 0.1 second)

Deionized water (equilibrated at 23° C.±1° C.)

Cutting Die—Stainless Steel cutting die with dimensions 3.8 cm×3.2 cm

Polaroid 35 mm Slide Mount (commercially available from Polaroid Corporation or equivalent) 35 mm Slide Mount Holder (or equivalent)

Equilibrate samples of fibrous non-woven sheet in constant temperature and humidity environment of at 23° C.±1° C. and 50%±2% relative humidity for at least 24 hours prior to testing. The dissolution test is conducted under this temperature and relative humidity condition as well.

Measure the basis weight of the sample materials using known techniques.

Cut three dissolution test specimens from a fibrous non-woven sheet sample to be tested using cutting die (3.8 cm×3.2 cm), so it fits within the 35 mm slide mount which has an open area dimensions 24×36 mm.

Lock each specimen in a separate 35 mm slide mount.

The 2000 mL glass beaker is filled with 1600±5 mL deionized water and placed on top of a magnetic stirrer plate. A magnetic stirring rod is placed at the bottom of the beaker. The stirring speed is adjusted so that a steady vortex develops at the center of the beaker with the vortex bottom at the 1200 mL mark.

A trial run may be necessary to ensure the depth adjuster rod is set up properly. Secure the 35 mm slide mount in the alligator clamp of the 35 mm slide mount holder such that the long end of the slide mount is parallel to the water surface. The alligator clamp should be positioned in the middle of the long end of the slide mount. The alligator claim is soldiered to the end of a depth adjuster rod. The depth adjuster rod is set up in a way, so that when the paper binder clip is lowered into the water, the entire fibrous non-woven sheet specimen is completely submerged in the water at the center of the beaker, the top of fibrous non-woven sheet specimen is at the bottom of the vortex, and the bottom of the slide mount/slide mount holder is not in direct contact with the stirring bar. The depth adjuster rod and alligator clamp should be set so that the position of the apertured film wall material specimen's surface is perpendicular to the flow of the water.

In one motion, drop the secured slide and clamp into the water and start the timer. The fibrous non-woven sheet specimen is dropped so that the specimen is centered in the beaker. When all of the visible fibrous non-woven sheet specimen is released from the slide mount, raise the slide out of the water while continuing the monitor the solution for undissolved specimen fragments. Dissolution occurs when all specimen fragments are no longer visible. Record this as the dissolution time.

Three replicates of each specimen are run and the average dissolution times are reported to within +/−0.1 seconds. Average dissolution time is in units of seconds.

The average dissolution times are normalized for basis weight by dividing each by the specimen basis weight as determined by known basis weight methods. Basis weight normalized average dissolution times are in units of seconds/gsm of sample (s/(g/m2)).

Method to Determine logP

The value of the log of the Octanol/Water Partition Coefficient (logP) is computed for each PRM in the perfume mixture being tested. The logP of an individual PRM is calculated using the Consensus logP Computational Model, version 14.02 (Linux) available from Advanced Chemistry Development Inc. (ACD/Labs) (Toronto, Canada) to provide the unitless logP value. The ACD/Labs' Consensus logP Computational Model is part of the ACD/Labs model suite.

Mean Shell Thickness Measurement

The capsule shell, including the first shell component and the second shell component, when present, is measured in nanometers on twenty benefit agent containing delivery capsules making use of a Focused Ion Beam Scanning Electron Microscope (FIB-SEM; FEI Helios Nanolab 650) or equivalent. Samples are prepared by diluting a small volume of the liquid capsule dispersion (20 μl) with distilled water (1:10). The suspension is then deposited on an ethanol cleaned aluminium stub and transferred to a carbon coater (Leica EM ACE600 or equivalent). Samples are left to dry under vacuum in the coater (vacuum level: $10^{-5}$ mbar). Next 25-50 nm of carbon is flash deposited onto the sample to deposit a conductive carbon layer onto the surface. The aluminium stubs are then transferred to the FIB-SEM to prepare cross-sections of the capsules. Cross-sections are prepared by ion milling with 2.5 nA emission current at 30 kV accelerating voltage using the cross-section cleaning pattern. Images are acquired at 5.0 kV and 100 pA in immersion mode (dwell time approx. 10 μs) with a magnification of approx. 10,000.

Images are acquired of the fractured shell in cross-sectional view from 20 benefit delivery capsules selected in a random manner which is unbiased by their size, to create a representative sample of the distribution of capsules sizes present. The shell thickness of each of the 20 capsules is measured using the calibrated microscope software at 3 different random locations, by drawing a measurement line perpendicular to the tangent of the outer surface of the capsule shell. The 60 independent thickness measurements are recorded and used to calculate the mean thickness.

Mean and Coefficient of Variation of Volume-Weighted Capsule Diameter

Capsule size distribution is determined via single-particle optical sensing (SPOS), also called optical particle counting (OPC), using the AccuSizer 780 AD instrument or equivalent and the accompanying software CW788 version 1.82 (Particle Sizing Systems, Santa Barbara, California, U.S.A.), or equivalent. The instrument is configured with the following conditions and selections: Flow Rate=1 mL/sec; Lower Size Threshold=0.50 μm; Sensor Model Number=LE400-05SE or equivalent; Auto-dilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at most 9200 per mL. During a time period of 60 seconds the suspension is analyzed. The range of size used was from 1 μm to 493.3 μm.

Volume Distribution:

$$CoVv(\%) = \frac{\sigma_v}{\mu_v} * 100$$

$$\sigma v = \sum_{i=1\ um}^{493.3\ um} \left(x_{i,v} * (d_i - \mu_v)^2\right)0.5$$

$$\mu_v = \frac{\sum_{i=1\ um}^{493.3\ um} (x_{i,v} * d_i)}{\sum_{i=1\ um}^{493.3\ um} x_{i,v}}$$

where:

$CoV_v$—Coefficient of variation of the volume weighted size distribution $\sigma_v$—Standard deviation of volume-weighted size distribution $\mu_v$—mean of volume-weighted size distribution $d_i$—diameter in fraction i $x_{i,v}$—frequency in fraction i (corresponding to diameter i) of volume-weighted size distribution $$x_{i,v} = \frac{x_{i,n} * d_i^3}{\sum_{i=1\ um}^{493.3\ um} \left(x_{i,n} * d_i^3\right)}$$

Volumetric Core-Shell Ratio Evaluation

The volumetric core-shell ratio values are determined as follows, which relies upon the mean shell thickness as measured by the Shell Thickness Test Method. The volumetric core-shell ratio of capsules where their mean shell thickness was measured is calculated by the following equation:

$$\frac{\text{Core}}{\text{Shell}} = \frac{\left(1 - \frac{2 * \text{Thickness}}{D_{caps}}\right)^3}{\left(1 - \left(1 - \frac{2 * \text{Thickness}}{D_{caps}}\right)^3\right)}$$

wherein Thickness is the mean shell thickness of a population of capsules measured by FIBSEM and the $D_{caps}$ is the mean volume weighted diameter of the population of capsules measured by optical particle counting.

This ratio can be translated to fractional core-shell ratio values by calculating the core weight percentage using the following equation:

$$\%\text{Core} = \left(\frac{\frac{\text{Core}}{\text{Shell}}}{1 + \frac{\text{Core}}{\text{Shell}}}\right) * 100$$

and shell percentage can be calculated based on the following equation:
% Shell=100−% Core.

Degree of Branching Method

The degree of branching of the precursors was determined as follows: Degree of branching is measured using (29Si) Nuclear Magnetic Resonance Spectroscopy (NMR).

Sample Preparation

Each sample is diluted to a 25% solution using deuterated benzene (Benzene-D6 "100%" (D, 99.96% available from Cambridge Isotope Laboratories Inc., Tewksbury, MA, or equivalent). 0.015 M Chromium(III) acetylacetonate (99.99% purity, available from Sigma-Aldrich, St. Louis, MO, or equivalent) is added as a paramagnetic relaxation reagent. If glass NMR tubes (Wilmed-LabGlass, Vineland, NJ or equivalent) are used for analysis, a blank sample must also be prepared by filling an NMR tube with the same type of deuterated solvent used to dissolve the samples. The same glass tube must be used to analyze the blank and the sample.

Sample Analysis

The degree of branching is determined using a Bruker 400 MHz Nuclear Magnetic Resonance Spectroscopy (NMR) instrument, or equivalent. A standard silicon (29Si) method (e.g. from Bruker) is used with default parameter settings with a minimum of 1000 scans and a relaxation time of 30 seconds.

Sample Processing

The samples are stored and processed using system software appropriate for NMR spectroscopy such as MestReNova version 12.0.4-22023 (available from Mestrelab Research) or equivalent. Phase adjusting and background correction are applied. There is a large, broad, signal present that stretches from −70 to −136 ppm which is the result of using glass NMR tubes as well as glass present in the probe housing. This signal is suppressed by subtracting the spectra of the blank sample from the spectra of the synthesized sample provided that the same tube and the same method parameters are used to analyze the blank and the sample. To further account for any slight differences in data collection, tubes, etc., an area outside of the peaks of interest area should be integrated and normalized to a consistent value. For example, integrate —117 to —115 ppm and set the integration value to 4 for all blanks and samples.

The resulting spectra produces a maximum of five main peak areas. The first peak (Q0) corresponds to unreacted TAOS. The second set of peaks (Q1) corresponds to end groups. The next set of peaks (Q2) correspond to linear groups. The next set of broad peaks (Q3) are semi-dendritic units. The last set of broad peaks (Q4) are dendritic units. When PAOS and PBOS are analyzed, each group falls within a defined ppm range. Representative ranges are described in the following table:

| Group ID | # of Bridging Oxygen per Silicon | ppm Range |
|---|---|---|
| Q0 | 0 | −80 to −84 |
| Q1 | 1 | −88 to −91 |
| Q2 | 2 | −93 to −98 |
| Q3 | 3 | −100 to −106 |
| Q4 | 4 | −108 to −115 |

Polymethoxysilane has a different chemical shift for Q0 and Q1, an overlapping signal for Q2, and an unchanged Q3 and Q4 as noted in the table below:

| Group ID | # of Bridging Oxygen per Silicon | ppm Range |
|---|---|---|
| Q0 | 0 | −78 to −80 |
| Q1 | 1 | −85 to −88 |
| Q2 | 2 | −91 to −96 |
| Q3 | 3 | −100 to −106 |
| Q4 | 4 | −108 to −115 |

The ppm ranges indicated in the tables above may not apply to all monomers. Other monomers may cause altered chemical shifts, however, proper assignment of Q0-Q4 should not be affected.

Using MestReNova, each group of peaks is integrated, and the degree of branching can be calculated by the following equation:

$$\text{Degree of Branching} = (1/4) * \frac{3 * Q3 + 4 * Q4}{Q1 + Q2 + Q3 + Q4}.$$

Molecular weight and Polydispersity Index Determination Method

The molecular weight (Polystyrene equivalent Weight Average Molecular Weight (Mw)) and polydispersity index (Mw/Mn) of the condensed layer precursors described herein are determined using Size Exclusion Chromatography with Refractive Index detection. Mn is the number average molecular weight.

Sample Preparation

Samples are weighed and then diluted with the solvent used in the instrument system to a targeted concentration of 10 mg/mL. For example, weigh 50 mg of polyalkoxysilane into a 5 mL volumetric flask, dissolve and dilute to volume with toluene. After the sample has dissolved in the solvent, it is passed through a 0.45 um nylon filter and loaded into the instrument autosampler.

Sample Analysis

An HPLC system with autosampler (e.g. Waters 2695 HPLC Separation Module, Waters Corporation, Milford MA, or equivalent) connected to a refractive index detector (e.g. Wyatt 2414 refractive index detector, Santa Barbara, CA, or equivalent) is used for polymer analysis. Separation is performed on three columns, each 7.8 mm I.D.×300 mm in length, packed with 5 μm polystyrene-divinylbenzene media, connected in series, which have molecular weight cutoffs of 1, 10, and 60 kDA, respectively. Suitable columns are the TSKGel G1000HHR, G2000HHR, and G3000HHR columns (available from TOSOH Bioscience, King of Prussia, PA) or equivalent. A 6 mm I.D.×40 mm long 5 μm polystyrene-divinylbenzene guard column (e.g. TSKgel Guardcolumn HHR-L, TOSOH Bioscience, or equivalent) is used to protect the analytical columns. Toluene (HPLC grade or equivalent) is pumped isocratically at 1.0 mL/min, with both the column and detector maintained at 25° C. 100 μL of the prepared sample is injected for analysis. The sample data is stored and processed using software with GPC calculation capability (e.g. ASTRA Version 6.1.7.17 software, available from Wyatt Technologies, Santa Barbara, CA or equivalent.)

The system is calibrated using ten or more narrowly dispersed polystyrene standards (e.g. Standard ReadyCal Set, (e.g. Sigma Aldrich, PN 76552, or equivalent) that have known molecular weights, ranging from about 0.250-70 kDa and using a third order fit for the Mp verses Retention Time Curve.

Using the system software, calculate and report Weight Average Molecular Weight (Mw) and PolyDispersity Index (Mw/Mn).

Method of Calculating Organic Content in First Shell Component

As used herein, the definition of organic moiety in the inorganic shell of the capsules according to the present disclosure is: any moiety X that cannot be cleaved from a metal precursor bearing a metal M (where M belongs to the group of metals and semi-metals, and X belongs to the group of non-metals) via hydrolysis of the M-X bond linking said moiety to the inorganic precursor of metal or semi-metal M and under specific reaction conditions, will be considered as organic. A minimal degree of hydrolysis of 1% when exposed to neutral pH distilled water for a duration of 24 h without stirring, is set as the reaction conditions.

This method allows one to calculate a theoretical organic content assuming full conversion of all hydrolysable groups. As such, it allows one to assess a theoretical percentage of organic for any mixture of silanes and the result is only indicative of this precursor mixture itself, not the actual organic content in the first shell component. Therefore, when a certain percentage of organic content for the first shell component is disclosed anywhere in this document, it is to be understood as containing any mixture of unhydrolyzed or pre-polymerized precursors that according to the below calculations give a theoretical organic content below the disclosed number.

Example for Silane (but not Limited thereto; See Generic Formula at the End of this Section)

Consider a mixture of silanes, with a molar fraction $Y_i$ for each, and where i is an ID number for each silane. Said mixture can be represented as follows:

$Si(XR)_{4-n}R_n$ where XR is a hydrolysable group under conditions mentioned in the definition above, $R^i_{ni}$ is non-hydrolyzable under conditions mentioned above and $n_i$=0, 1, 2 or 3.

Such a mixture of silanes will lead to a shell with the following general formula:

$$SiO_{\frac{(4-n)}{2}}R_n$$

Then, the weight percentage of organic moieties as defined earlier can be calculated as follows:

1) Find out Molar fraction of each precursor (nanoparticles included)
2) Determine general formula for each precursor (nanoparticles included)
3) Calculate general formula of precursor and nanoparticle mixture based on molar fractions
4) Transform into reacted silane (all hydrolysable groups to oxygen groups)
5) Calculate weight ratio of organic moieties vs. total mass (assuming 1 mole of Si for framework)

Example:

| Raw material | Formula | Mw (g/mol) | weight (g) | amount (mmol) | Molar fraction |
|---|---|---|---|---|---|
| Sample AY | $SiO(OEt)_2$ | 134 | 1 | 7.46 | 0.57 |
| TEOS | $Si(OEt)_4$ | 208 | 0.2 | 0.96 | 0.07 |
| DEDMS | $Si(OEt)_2Me_2$ | 148.27 | 0.2 | 1.35 | 0.10 |
| SiO2 NP | $SiO_2$ | 60 | 0.2 | 3.33 | 0.25 |

To calculate the general formula for the mixture, each atoms index in the individual formulas is to be multiplied by their respective molar fractions. Then, for the mixture, a sum of the fractionated indexes is to be taken when similar ones occur (typically for ethoxy groups).

Note: Sum of all Si fractions will always add to 1 in the mixture general formula, by virtue of the calculation method (sum of all molar fractions for Si yields 1).

$SiO_{1*0.57+2*0.25}(OEt)_{2*0.57+4*0.07+2*0.10}Me_{2*0.10}$ $SiO_{1.07}(OEt)_{1.62}Me_{0.20}$

To transform the unreacted formula to a reacted one, simply divide the index of ALL hydrolysable groups by 2, and then add them together (with any pre-existing oxygen groups if applicable) to obtain the fully reacted silane.

$SiO_{1.88}Me_{0.20}$

In this case, the expected result is $SiO_{1.9}Me_{0.2}$, as the sum of all indexes must follow the following formula:

$$A+B/2=2,$$

where A is the oxygen atom index and B is the sum of all non-hydrolysable indexes. The small error occurs from rounding up during calculations and should be corrected. The index on the oxygen atom is then readjusted to satisfy this formula.

Therefore, the final formula is $SiO_{1.9}Me_{0.2}$, and the weight ratio of organic is calculated below:

$$\text{Weight ratio}=(0.20*15)/(28+1.9*16+0.20*15)=4.9\%$$

General case

The above formulas can be generalized by considering the valency of the metal or semi-metal M, thus giving the following modified formulas:

$M(XR)_{V-ni}R^{i}_{ni}$ and using a similar method but considering the valency V for the respective metal.

Wash Test and Headspace Analysis

The method of treating a fabric includes the use of a commercial washing machine, such as a Miele Honeycomb Care W1724, or other similar machine using standard machine settings (cotton short cycle program at 40° C., 1200 RPM for 1 hr 14 min using water with 2.5 mmol/L hardness). The fabric composition in the washing machine consists of terry cotton and polyester test fabrics and a standard ballast load consisting of a mixture of polycotton and cotton, totaling 3 kilograms.

Wet fabric tracers were subjected immediately following the washing cycle to a perfume headspace analysis. For examples using a laundry detergent composition, eight replicates of each type of tracer per wash test were analyzed by fast headspace GC/MS; for examples using a laundry additive composition, four replicates were used. 4×4 cm aliquots of the fabric tracers were transferred to 25 mL headspace vials. The fabric samples were equilibrated for 10 minutes at 65° C. The headspace above the fabrics was sampled via SPME (50/30 μm DVB/Carboxen/PDMS) approach for 5 minutes. The SPME fibre was subsequently on-line thermally desorbed into the GC. The analytes were analyzed by fast GC/MS in full scan mode. Ion extraction of the specific masses of the perfume raw materials were used to calculate the total headspace response (expressed in nmol/l) above the tested legs.

EXAMPLES

The examples provided below are intended to be illustrative in nature and are not intended to be limiting.

Materials

The following materials are used in the following examples.

Fibres/Non-woven substrate

Purchased PVOH fibres were converted into nonwoven sheets by JIANGSU WISDOM NONWOVEN CO. LTD, Address: No. 19, RenMinDong Road, Wu Jin, Changzhou, Jiangsu, China. The composition by weight of the fibres was as follows:

95 wt % PVOH homopolymer (100-120 kDa; degree of hydrolysis 86-89%);

5 wt % PEG600 gel-breaker.

Perfume Capsules and Related Slurries

Two types of perfume (Perfume 1 and Perfume 2) are provided. Perfume is encapsulated in two types of perfume capsules, the synthesis routes of which are described below.

A. Silica-Shell-Based Perfume Capsules (Capsules CCORDING to the Present Disclosure)

The oil phase was prepared by mixing and homogenizing 44 gr of a non-hydrolytic precursor (see below) with 88.75 gr of perfume 1 or perfume 2.

The water phase was prepared by adding 7.6 gr of Aerosil 300 (available from Evonik) to 374 gr of 0.1 M HCl (available from Sigma Aldrich) in a glass vessel, and then dispersed with an IKA S25N-25F Ultraturrax rotor-stator at 20000 rpm during 10 minutes. The solution was let cooling to room temperature before usage in case of heat generation during the dispersion.

Once each phase was prepared separately, the water phase was added into a vessel of 10 cm in diameter. A S25N-25F ultraturrax (IKA) mixing tool was then used at 7000 rpm whilst slowly adding the oil phase to the vessel over a duration of 30 seconds, after which the emulsification was continued at 7000 rpm for 2 minutes with the same mixing tool in the same vessel.

Once the emulsification step was completed, the resulting emulsion was cured in a 500 ml jacketed glass reactor whilst mixing at 80 rpm, using the following temperature profile: 4 h at 30° C., 20 h at 90° C. and another 2 h at 30 C. This yielded capsules of the present invention comprising a first shell component surrounding perfume 1, wherein the first shell component comprises a nanoparticle layer surrounding the condensed precursor.

In order to deposit a second shell component, 125 gr of the above capsule slurry was added into a glass vessel equipped with a suspended stirbar stirring at 360 rpm. Next, 16 ml of a 10 w % solution of sodium metasilicate (available from sigma Aldrich) in demineralized water solution was added at a rate of 80 microliters/min with a syringe pump (Harvard apparatus), which increased the pH of the solution from 1.2 to 7, and once the mixtures pH started to increase above 7, a second pump activated to inject simultaneously 1.6 M HCl (aq.) such that the pH remained between 6.5 and 7.5 for the remainder of the addition of the sodium metasilicate solution.

After the infusion of the second shell component solution finished, the capsules were centrifuged for 10 minutes at 2500 RPM and re-dispersed in de-ionized water. The resulting capsules comprise a silica-based first shell component and a second shell component according to the present disclosure.

1. Non-hydrolytic Precursor Synthesis 1000 g of tetraethoxysilane (TEOS, available from Sigma Aldrich) was added to a clean dry round bottom flask equipped with a stir bar and distillation apparatus under nitrogen atmosphere. 431 gr of acetic anhydride (available from Sigma Aldrich) and 5.8 g of tetrakis(trimethylsiloxy) titanium (available from Gelest) were added and the contents of the flask were vigurously stirred for 16 hours at 135° C. Next, another 107 gr of acetic anhydride was added to the mixture, which was then further heated at 135 C for another 32 hours. During this time, the ethyl acetate generated by reaction of the ethoxy silane groups with acetic anhydride was distilled off The reaction flask was cooled to room temperature and placed on a rotary evaporator (Buchi Rotovapor R110), used in conjunction with a water bath and vacuum pump (Welch 1402 DuoSeal) to remove any remaining solvent and volatile compounds. The polyethoxysilane (PEOS) generated was a yellow viscous liquid with the following specifications found in Table A. The ratio of TEOS to acetic anhydride can be varied to control the parameters presented in Table A.

TABLE A

| Parameters of PEOS | Results |
|---|---|
| Degree of branching (DB) | 0.32 |
| Molecular weight (Mw) | 2.35 |
| Polydispersity index (PDI) | 2.4 |

B. Polyacrylate-Shell-Based Perfume Capsules (Comparative Capsules)

A population of perfume capsules comprising a polyacrylate shell, encapsulating perfume 1, was prepared according to encapsulates made according to the processes disclosed in US Publication No. 2011/0268802

C. Freeze Drying of Liquid Slurries of Capsules

The above synthesis descriptions for silica-shell-based capsules and polyacrylate-shell-based capsules yielded liquids containing the capsules. In order to incorporate these into dry laundry formulations, the capsules were first freeze dried. The freeze drying steps were as follows:

1) 100 gr of the slurry was introduced into a 600 ml glass vessel suitable for the particular freeze drying equipment. The capsule slurry was then frozen at −80 C for 1 hour.
2) Once the slurries were frozen, the glass vessels were attached to the freeze drier (Telstar LyoQuest—85 plus, or equivalent), after which the pressure was lowered to between 2 mBar and 3 mBar and the slurries were let dry for a minimum of 24 hours, depending on whether all of the water was removed.
3) Once the capsules were dried, a freeze dried capsule powder was obtained. Said freeze dried capsule powder was then analyzed via TGA (20 C./min ramp to 500 C.) to assess whether there were any remaining water, and also to calculate the perfume activity of the dried capsules (perfume activity is defined as the weight % of perfume in the powder sample). If water was still present, the capsules were further dried without passing via the freezing step.

Laundry Additive Composition

A laundry additive composition comprising capsules is prepared according to the following procedure:

1) 93.2 gr of Citric acid granules were added to a mixing vessel (Kenwood) equipped with a K-type mixing paddle.
2) A powder mixture was then prepared, which is composed of 12 gr of freeze dried capsules, 30 gr of powder citric acid (available from Sigma-Aldrich), and 16 gr of monosodium citrate (available from Sigma Aldrich), giving a total mass of 58 gr for the powder mixture
3) 1.8 gr of a 35 w % starch solution (made from starch available from sigma Aldrich dissolved into water) was added to a sprayer.
4) Once all 3 mixtures were prepared (i.e. citric acid granules in mixing bowl, powder ingredients and starch solution), 10% of the starch solution was sprayed onto the citric acid granules, and 10% of the powder mixture of step 2 was added whilst mixing on the lowest setting in the mixing bowl. Once homogeneous, another 10% of the starch solution was added, followed by another 10% addition of the powder mixture, repeating this iteration until all of the starch and powder mixture had been used.

Laundry Detergent Composition

A laundry detergent composition comprising capsules is prepared according to the following procedure:

90 gr of a powdered laundry detergent composition comprising perfume capsules was prepared by targeting 0.5 w % of perfume in the final formulation, by mixing powder detergent (standard detergent type A from WFK) and freeze-dried capsules together with a spoon, until a homogeneous dispersion of the capsules in the powder mixture was obtained.

Example 1. Effect of PVOH on Silica-Based-Shell Capsules in a Laundry Additive

To test the effect that polyvinyl alcohol (PVOH) has on silica-based-shell perfume capsules in a laundry additive composition, the following experiments were run.

Two test legs (see Table 1A, where Leg 1 is a comparative test leg) were prepared by adding the components of each below composition into 2 L of water:

TABLE 1A

| Leg | Composition | Perfume Capsules | PVOH Pouch |
|---|---|---|---|
| 1 (comp.) | 7.5 g of laundry additive composition | Silica-based-shell perfume capsules | - none - |
| 2 (inv.) | 7.5 g of laundry additive composition | Silica-based-shell perfume capsules | Water-soluble non-woven pouch with fibres made of PVOH; dimensions = 4 cm × 10 cm |

79 grams of detergent powder type A (WFK) was added into the drum before the start of the washing test. The pre-dissolved two legs were then added to their respective washing machines by adding them into the fabric softener container whilst the last rinse of the washing program is occurring. The protocol for the Wash Test is described above in the Test Method section.

Table 1B summarizes the total perfume headspace response (in nmol/L) over wet terry cotton tracers as well as the single variable headspace loss/gain effect due to the addition of the polyvinyl alcohol non-woven pouch, for silica shell capsules according to the present disclosure.

TABLE 1B

| Leg | Description | Total HS (nmol/L)* | Impact of PVOH |
|---|---|---|---|
| 1 (comp.) | Silica-based-shell Capsules | 272.8 $^{A}$ | — |
| 2 (inv.) | Silica-based-shell Capsules + PVOH pouch | 383.0 $^{B}$ | +40% |

*Levels not connected by same letter are significantly different (student's t test)

As shown by the results in Table 1B, there is a 40% increase in total perfume headspace for silica-based-shell capsules in rinse-added laundry additive compositions when combined with a polyvinylalcohol non-woven pouch.

Example 2. Effect of PVOH on Different Perfume Capsules in a Detergent

To test the effect that polyvinyl alcohol (PVOH) has on different perfume capsules in a laundry detergent composition, the following experiments were run.

Four test legs were prepared, as shown in Table 2A. Legs 1, 3, and 4 are comparative test legs.

TABLE 2A

| Leg | Composition | Perfume Capsules | PVOH Pouch |
|---|---|---|---|
| 1 (comp.) | 90 g of laundry detergent composition | Silica-based-shell perfume capsules | - none - |
| 2 (inv.) | 90 g of laundry detergent composition | Silica-based-shell perfume capsules | Water-soluble non-woven pouch with fibres made of PVOH; dimensions = 4 cm × 10 cm |
| 3 (comp.) | 90 g of laundry detergent composition | Polyacrylate-based-shell perfume capsules | - none - |
| 4 (comp.) | 90 g of laundry detergent composition | Polyacrylate-based-shell perfume capsules | Water-soluble non-woven pouch with fibres made of PVOH; dimensions = 4 cm × 10 cm |

Each of the above formulations were then added into the drum of their respective washing machines to be run according to the Wash Test described in the Test Methods section above.

Table 2B summarizes the total perfume headspace response (in nmol/L) over wet terry cotton tracers as well as the single variable headspace loss/gain effect due to the addition of the polyvinyl alcohol non-woven pouch.

TABLE 2B

| Leg | Description | Total HS (nmol/L) * | Impact of PVOH |
|---|---|---|---|
| 1 (comp.) | Silica Shell | 108.4 $^{A}$ | — |
| 2 (inv.) | Silica Shell + PVOH Pouch | 135.4 $^{B}$ | +25% |
| 3 (comp.) | Polyacrylate Shell | 184.7 $^{C}$ | — |
| 4 (comp.) | Polyacrylate Shell + PVOH Pouch | 169.2 $^{D}$ | −8% |

* Levels not connected by same letter are significantly different (student's t test)

As shown by the results in Table 2B, the data show a positive perfume headspace impact (+25% Total Headspace) of a polyvinyl alcohol non-woven pouch on terry cotton fabric tracer head space when combined with silica shell capsules in a laundry detergent context.

The results in Table 2B also show a negative impact (−8% Total Headspace) of a polyvinyl alcohol non-woven pouch when combined with polyacrylate shell capsules in a laundry detergent context. Additionally, it is worth noting that while the polyacrylate-based-shell capsules provided relatively greater headspace values, such shell materials may be petrochemically derived and therefore may be less preferred for sustainability reasons.

Example 3. Effect of PVP on Different Perfume Capsules in a Detergent

To test the effect that polyvinyl pyrrolidone ("PVP") has on different perfume capsules, the following experiments were run. A pre-dissolved form of a fabric treatment composition was created to create a single variable experiment.

Four test legs were formulated, as shown in Table 3A below. In each, a surfactant paste mixture is provided and dissolved in water to simulate a wash liquor. The surfactant paste mixture was composed of Sodium Lauryl Sulfate, Sodium Linear alkyl benzenesulfonates, and polyethyleneoxide oligomers (average n=10 for the monomer repeat unit).

To simulate the wash liquor, 16.5 g of demineralized water was added to a plastic container. 3.15 g of the surfactant paste was added to the water, and the mixture was put on a lab shaker at 300 rpms for one hour, or until the surfactant paste had completely dissolved. Next, perfume capsules and PVP polymer (PVP-k60 from Jarchem), if any, are added to the mixture (see Table 3A), whilst mixing with an overhead mixer at 500 rpm until the capsules were dispersed. The mixture was then ready for usage in a washing machine test.

TABLE 3A

| Leg | Surfactant | Perfume Capsules | PVP polymer |
|---|---|---|---|
| 1 (comp.) | 3.15 g of surfactant paste | 0.38 g of freeze-dried silica-based-shell perfume capsules | - none - |
| 2 (inv.) | 3.15 g of surfactant paste | 0.38 g of freeze-dried silica-based-shell perfume capsules | 0.93 g PVP |
| 3 (comp.) | 3.15 g of surfactant paste | 0.4 g of freeze-dried polyacrylate-based-shell perfume capsules | - none - |
| 4 (comp.) | 3.15 g of surfactant paste | 0.4 g of freeze-dried polyacrylate-based-shell perfume capsules | 0.93 g PVP |

Each of the above formulations were then added into the drum of their respective washing machines to be run according to the Wash Test described in the Test Methods section above.

Table 3B summarizes the total perfume headspace response (in nmol/L) over wet terry cotton tracers as well as the single variable headspace loss/gain effect due to the addition of the polyvinyl alcohol non-woven pouch.

TABLE 3B

| Leg | Description | Total HS (nmol/L)* | Impact of PVP |
|---|---|---|---|
| 1 (comp.) | Silica Shell | 45.1 $^{A}$ | |
| 2 (inv.) | Silica Shell + PVP | 53.3 $^{B}$ | +18% |
| 3 (comp.) | Polyacrylate Shell | 99.6 $^{C}$ | |
| 4 (comp.) | Polyacrylate Shell + PVP | 88.7 $^{D}$ | −11% |

*Levels not connected by same letter are significantly different (student's t test)

The results in Table 3B show an increase in total wet headspace when PVP is included in the washing slurry with silica shell capsules (+18%), whilst showing a negative impact when PVP is combined with polyacrylate shell capsules (−11%). Further, as described above, polyacrylate-based capsules may be petrochemically derived and therefore less preferred.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article comprising:
- a water-soluble fibrous non-woven substrate,
  - the substrate comprising a plurality of fibers,
    - the fibers comprising a water-soluble polymer comprising polyvinyl alcohol, polyvinyl pyrrolidone, or both; and
- a particulate treatment composition,
  - the particulate treatment composition comprising capsules,
    - the capsules comprising a core and a shell surrounding the core,
      - the core comprising a benefit agent,
      - the shell comprising an inorganic material comprising silica;
- wherein the capsules are commingled with the plurality of fibers of the water-soluble fibrous non-woven substrate.

2. The water-soluble unit dose article according to claim 1, wherein the water-soluble fibrous non-woven substrate has a basis weight of between 20 gsm and 60 gsm.

3. The water-soluble unit dose article according to claim 1, wherein the water-soluble fibrous non-woven substrate is in the form of a sheet that is shaped to form at least one sealed internal compartment, wherein the treatment composition is contained with the sealed internal compartment.

4. The water-soluble unit dose article according to claim 1, wherein the fibers further comprise a gel-breaker,
- wherein the gel-breaker is selected from polyols, sugar alcohols, amines, amides, carbohydrates, multivalent cations, or a mixture thereof.

5. The water-soluble unit dose article according to claim 1, wherein the benefit agent comprises perfume.

6. The water-soluble unit dose article according to claim 1, wherein the shells of the capsules comprise from about 90% and about 100%, by weight of the shell, of the inorganic material.

7. The water-soluble unit dose article according to according to claim 1, wherein the inorganic material in the shell comprises a material selected from metal oxide, semi-metal oxides, metals, minerals, or mixtures thereof.

8. The water-soluble unit dose article according to according to claim 1, wherein the shell comprises:
- (a) a first shell component comprising a condensed layer and a nanoparticle layer, where the condensed layer comprises a condensation product of a precursor, and where the nanoparticle layer comprises inorganic nanoparticles, and where the condensed layer is disposed between the core and the nanoparticle layer; and
- (b) a second shell component surrounding the first shell component, where the second shell component surrounds the nanoparticle layer.

9. The water-soluble unit dose article according to according to claim 1, wherein the capsules are characterized by one or more of the following:
- (a) a mean volume weighted capsule diameter of from about 1 μm to 250 μm;
- (b) an average shell thickness of about 170 nm to about 1000 nm;
- (c) a volumetric core/shell ratio of from about 50:50 to about 99:1;
- (d) the first shell component comprises no more than about 5 wt % of organic content, by weight of the first shell component; or
- (e) a mixture thereof.

10. The water-soluble unit dose article according to claim 8, wherein the precursor comprises at least one compound selected from the group consisting of Formula (I), Formula (II), or a mixture thereof,
- wherein Formula (I) is $(M^vO_zY_n)_w$,
- wherein Formula (II) is $(M^vO_zY_nR^1_p)_w$,
- wherein for Formula (I), Formula (II), or the mixture thereof:
  - each M is independently selected from the group consisting of silicon, titanium, and aluminum,
  - v is the valence number of M and is about 3 or about 4,
  - z is from about 0.5 to about 1.6,
  - each Y is independently selected from —OH, —$OR^2$, halogen,

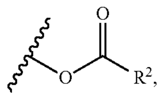

—$NH_2$, —$NHR^2$, —$N(R^2)_2$, and

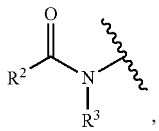

,

- wherein $R^2$ is a $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S;
  - wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S;
  - w is from about 2 to about 2000;
  - wherein for Formula (I), n is from 0.7 to (v−1); and
  - wherein for Formula (II), n is from 0 to (v−1);
  - each $R^1$ is independently selected from the group consisting of: a $C_1$ to $C_{30}$ alkyl; a $C_1$ to $C_{30}$ alkylene; a $C_1$ to $C_{30}$ alkyl substituted with a member selected from the group consisting of a halogen, —$OCF_3$ , —$NO_2$, —CN, —NC, —OH, —OCN, —NCO, alkoxy, epoxy, amino, mercapto, acryloyl, —$CO_2H$, —C(O)-alkyl, —C(O)O-aryl, and —C(O)O-heteroaryl; and a $C_1$ to $C_{30}$ alkylene substituted with a member selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, wherein pmax=60/[9*Mw($R^1$)+8], wherein Mw($R^1$) is the molecular weight of the $R^1$ group.

11. The water-soluble unit dose article according to claim 10, wherein for the compounds of Formula (I), Formula (II), or both, M is silicon.

12. The water-soluble unit dose article according to claim 10, wherein one of the compounds of Formula (I), Formula (II), or both are characterized by one or more of the following:

(a) a Polystyrene equivalent Weight Average Molecular Weight (Mw) of from about 700 Da to about 30,000 Da;

(b) a degree of branching of about 0.2 to about 0.6;

(c) a molecular weight polydispersity index of about 1 to about 20; or (d) a mixture thereof.

13. The water-soluble unit dose article according to claim 10, wherein for Formula (I), Formula (II), or both, Y is OR, wherein R is selected from a methyl group, an ethyl group, a propyl group, or a butyl group.

14. The water-soluble unit dose article according to claim 8, wherein the inorganic nanoparticles of the first shell component comprise at least one of metal nanoparticles, mineral nanoparticles, metal-oxide nanoparticles or semi-metal oxide nanoparticles or a mixture thereof.

15. The water-soluble unit dose article according to claim 8, wherein the second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, clay, or a mixture thereof.

16. The water-soluble unit dose article according to claim 1, wherein the particulate treatment composition further comprises from about 10% to about 99%, by weight of the particulate treatment composition of an acid and/or a salt thereof, wherein the acid and/or the salt thereof is selected from the group consisting of acetic acid, propionic acid, butyric acid, isobutyric acid, valeric acid, caproic acid, citric acid, succinic acid, hydroxysuccinic acid, maleic acid, fumaric acid, oxylic acid, glyoxylic acid, adipic acid, lactic acid, lactic acid, tartric acid, salicylic acid, ascorbic acid, a salt thereof, and mixtures thereof.

17. The water-soluble unit dose article according to claim 1, wherein the particulate treatment composition further comprises from about 10% to about 99%, by weight of the particulate treatment composition of an acid and/or a salt thereof, wherein the acid and/or the salt thereof is a mixture of citric acid and sodium citrate, wherein the weight ratio of citric acid to sodium citrate is from about 1:1 to about 20:1.

18. The water-soluble unit dose article according to claim 1, wherein the article further comprises surfactant.

19. A method of treating a fabric, the method comprising the steps of:

combining water and the water-soluble unit dose article according to claim 1 to form a treatment liquor; and contacting a fabric with the treatment liquor.

* * * * *